(12) United States Patent
Chen et al.

(10) Patent No.: US 8,277,669 B1
(45) Date of Patent: Oct. 2, 2012

(54) METHOD AND SYSTEM FOR PROVIDING A PERPENDICULAR MAGNETIC RECORDING POLE HAVING A LEADING EDGE BEVEL

(75) Inventors: Tsung Yuan Chen, San Jose, CA (US); Yimin Guo, San Jose, CA (US); Jinqiu Zhang, Fremont, CA (US); Ut Tran, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 338 days.

(21) Appl. No.: 12/643,954

(22) Filed: Dec. 21, 2009

(51) Int. Cl.
*B44C 1/22* (2006.01)
(52) U.S. Cl. .................. 216/22; 360/125.3; 360/125.12; 360/125.16; 29/603.15
(58) Field of Classification Search .................... 216/22; 360/125.3, 125.12, 125.15; 29/603.15
See application file for complete search history.

(56) References Cited

U.S. PATENT DOCUMENTS

| | | | |
|---|---|---|---|
| 5,540,346 A | 7/1996 | Fujimoto et al. | |
| 7,159,302 B2 | 1/2007 | Feldbaum et al. | |
| 7,367,112 B2 | 5/2008 | Nix et al. | |
| 7,430,095 B2 | 9/2008 | Benakli et al. | |
| 7,444,740 B1 | 11/2008 | Chung et al. | |
| 7,464,457 B2 | 12/2008 | Le et al. | |
| 7,549,213 B2 | 6/2009 | Hsu et al. | |
| 7,565,732 B2 | 7/2009 | Le et al. | |
| 7,576,951 B2 | 8/2009 | Allen et al. | |
| 7,979,978 B2 * | 7/2011 | Han et al. ................... | 29/603.15 |
| 8,077,434 B1 * | 12/2011 | Shen et al. ............... | 360/125.12 |
| 8,166,631 B1 | 5/2012 | Tran et al. | |
| 2005/0237665 A1 * | 10/2005 | Guan et al. .................... | 360/125 |
| 2006/0044681 A1 | 3/2006 | Le et al. | |
| 2006/0044682 A1 | 3/2006 | Le et al. | |
| 2006/0225268 A1 | 10/2006 | Le et al. | |
| 2006/0288565 A1 | 12/2006 | Le et al. | |
| 2007/0115584 A1 | 5/2007 | Balamane et al. | |
| 2007/0177301 A1 | 8/2007 | Han et al. | |
| 2008/0026254 A1 | 1/2008 | Hsiao et al. | |
| 2008/0100959 A1 | 5/2008 | Feldbaum et al. | |
| 2008/0110761 A1 | 5/2008 | Lam et al. | |
| 2008/0113090 A1 | 5/2008 | Lam et al. | |
| 2008/0151437 A1 | 6/2008 | Chen et al. | |
| 2008/0253035 A1 | 10/2008 | Han et al. | |
| 2008/0273276 A1 | 11/2008 | Guan | |
| 2008/0273277 A1 | 11/2008 | Guan et al. | |
| 2008/0278861 A1 | 11/2008 | Jiang et al. | |
| 2008/0297945 A1 | 12/2008 | Han et al. | |
| 2009/0002885 A1 | 1/2009 | Sin | |
| 2009/0116145 A1 | 5/2009 | Guan et al. | |
| 2009/0128952 A1 | 5/2009 | Sato et al. | |
| 2009/0168242 A1 | 7/2009 | Liu | |

(Continued)

*Primary Examiner* — Nadine G Norton
*Assistant Examiner* — Mahmoud Dahimene

(57) ABSTRACT

A method and system for providing a pole of magnetic transducer having an air-bearing surface (ABS) are described. Leading shield and planarization stop layers are provided. Portions of the planarization stop and shield layers distal from the ABS location are removed, providing a depression forming a bevel. The bevel has an angle greater than zero and less than ninety degrees. An intermediate layer having a top surface substantially perpendicular to the ABS location is provided. Part of the intermediate layer is removed, forming a trench having a bottom corresponding to the leading shield and a location and profile corresponding to the pole. A non-magnetic layer is provided at least partially in the trench. The pole with a leading edge bevel corresponding to the bevel is provided in the trench. A capping layer covering the pole is provided, at least part of the intermediate layer removed, and a wrap-around shield provided.

22 Claims, 24 Drawing Sheets

U.S. PATENT DOCUMENTS

| | | |
|---|---|---|
| 2009/0184091 A1 | 7/2009 | Zheng |
| 2009/0195920 A1 | 8/2009 | Bonhote et al. |
| 2010/0061016 A1 | 3/2010 | Han et al. |
| 2010/0062177 A1* | 3/2010 | Jiang et al. .................. 427/551 |
| 2010/0112486 A1 | 5/2010 | Zhang et al. |
| 2011/0094888 A1 | 4/2011 | Chen et al. |

* cited by examiner

METHOD AND SYSTEM FOR PROVIDING A PERPENDICULAR MAGNETIC RECORDING POLE HAVING A LEADING EDGE BEVEL

BACKGROUND

FIG. 1 is a flow chart depicting a conventional method 10 for fabricating a conventional perpendicular magnetic recording (PMR) transducer. For simplicity, some steps are omitted. The conventional method 10 is used for providing a PMR pole. An intermediate layer is provided, via step 12. The intermediate layer is typically aluminum oxide. A mask is provided on the aluminum oxide layer, via step 14. The mask may be a hard mask patterned using a photoresist mask. The mask includes an aperture above the portion of the aluminum oxide layer in which the PMR pole is to be formed. Using the mask, a trench is formed in the aluminum oxide layer, via step 16. The top of the trench is wider than the trench bottom. In addition, the trench may extend through the aluminum oxide layer to the underlayer. As a result, the PMR pole formed therein will have its top surface wider than its bottom. Consequently, the sidewalls of the PMR pole have a reverse angle. The conventional PMR pole materials are deposited, via step 18. Step 18 may include plating or sputtering ferromagnetic pole materials as well as seed layer(s). A chemical mechanical planarization (CMP) is then performed, via step 20. A top, or trailing edge, bevel may be formed in the pole, via step 22. Step 22 typically includes removing a portion of the remaining pole materials proximate to the air-bearing surface (ABS) location. The ABS location is the location at which the ABS will reside in the completed structure. Subsequent structures, such as a write gap and shields, may also be fabricated.

FIG. 2 depicts a portion of a conventional PMR transducer 50 formed using the conventional method 10. The conventional transducer 50 includes an underlayer 52, aluminum oxide layer 54 in which the trench for the pole 56 is formed. The pole 56 is shown as including trailing bevel 58. Thus, using the conventional method 10, a pole 56 having a trailing edge bevel may be formed in an aluminum oxide layer 54.

Although the conventional method 10 may provide the conventional PMR transducer 50, there may be drawbacks. In particular, writability is desired to be improved beyond that which the method 10 and the trailing bevel 58 may provide. For example, improved reverse overwrite and signal to noise ratio might be desired to be achieved. As a result, the shape of the pole 56 and distribution of the magnetic flux from the pole 56 may be desired to be changed. Further, other conventional methods exist which can fabricate other PMR transducers. However, such methods may be difficult or may have other drawbacks. Accordingly, what is needed is an improved method for fabricating a PMR transducer.

SUMMARY

A method and system for providing a pole of magnetic transducer having an air-bearing surface (ABS) are described. The method includes providing a leading shield layer and providing a planarization stop layer on the leading shield layer. The method and system also include removing a portion of the planarization stop layer distal from the ABS location to form an aperture therein and removing a portion of the leading shield layer distal from the ABS location to form a depression therein. The depression forms a bevel distal from the ABS location. The bevel is at an angle greater than zero degrees and less than ninety degrees from a direction perpendicular to the ABS location. The method and system also include providing an intermediate layer having a top surface substantially perpendicular to the ABS location and removing a portion of the intermediate layer to form a trench therein. The trench has a bottom corresponding to the leading shield and a location and a profile corresponding to the pole. The method and system also include providing a nonmagnetic layer, at least a portion of which resides in the trench. The method and system also include providing the pole in the trench. The pole resides on the portion of the nonmagnetic layer and has a leading edge bevel corresponding to the bevel. The method and system also include providing a capping layer covering the pole, removing at least a portion of the intermediate layer, and providing a wrap-around shield.

DETAILED DESCRIPTION OF THE PREFERRED EMBODIMENTS

Figure 1:
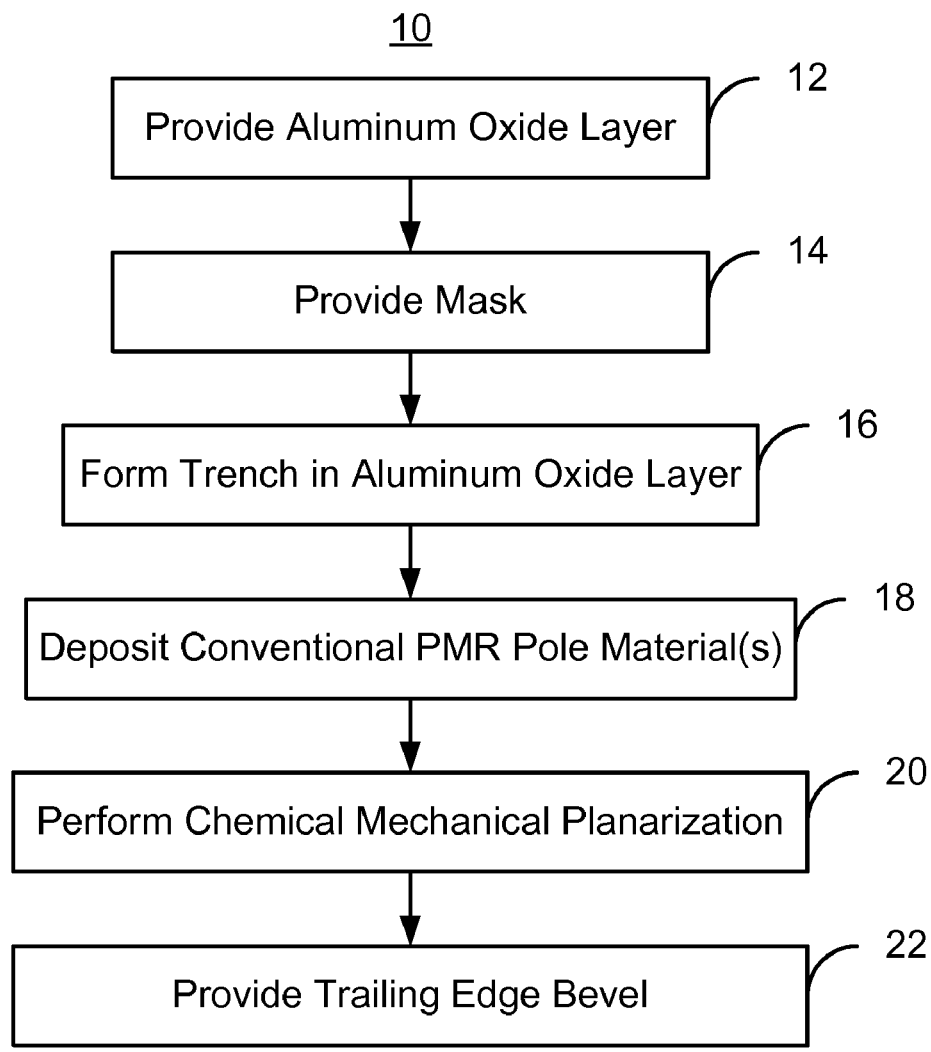
FIG. 1 is a flow chart depicting a conventional method for fabricating a PMR transducer.
Figure 2:
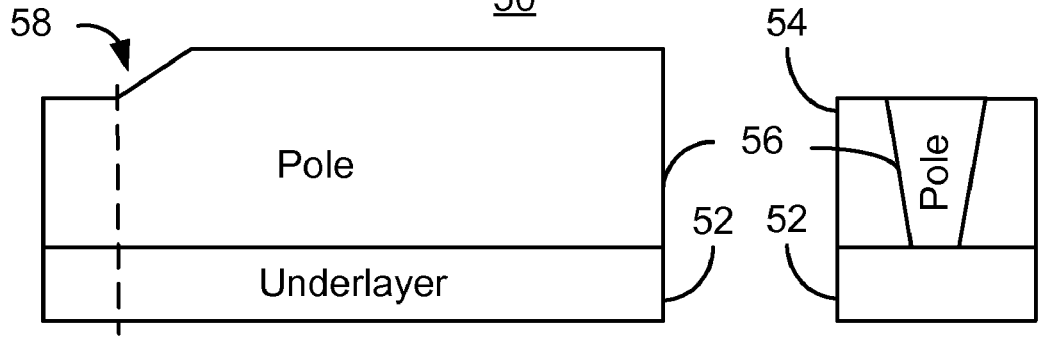
FIG. 2 is a diagram depicting a conventional PMR transducer.
Figure 3:
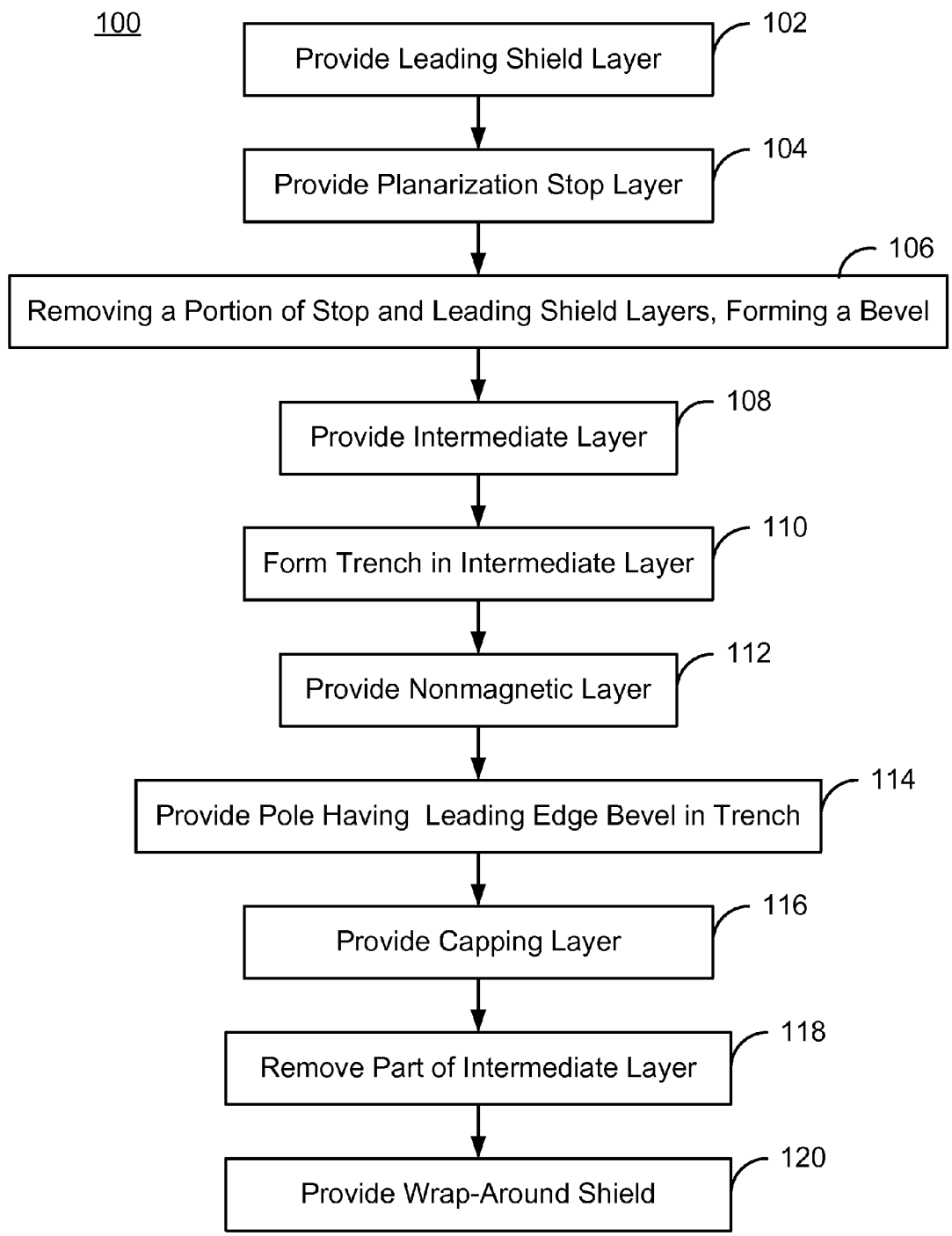
FIG. 3 is a flow chart depicting an exemplary embodiment of a method for fabricating a PMR transducer.

FIG. 3 is a flow chart depicting an exemplary embodiment of a method 100 for fabricating a transducer. The method 100 is described in the context of a PMR transducer, though other transducers might be so fabricated. For simplicity, some steps may be omitted and/or combined. The PMR transducer being fabricated may be part of a merged head that also includes a read head (not shown) and resides on a slider (not shown) in a disk drive. The method 100 also may commence after formation of other portions of the PMR transducer. The method 100 is also described in the context of providing a single PMR pole and its associated structures in a single magnetic recording transducer. However, the method 100 may be used to fabricate multiple transducers at substantially the same time. The method 100 and system are also described in the context of particular layers. However, in some embodiments, such layers may include multiple sub-layers. In one embodiment, the method 100 commences after formation of the underlayer(s) on which the PMR pole is to reside.

A leading shield layer is provided, via step 102. The shield layer is magnetically soft and may include materials such as NiFe. A stop layer is provided on the leading shield layer, via step 104. The stop layer is nonmagnetic has a thickness and a top surface. The stop layer is a planarization stop layer and may include one or more of Ta, Ru, and Cr bilayer.

A portion of each of the leading shield layer and the stop layer is removed distal from the ABS, via step 106. Thus, an aperture is formed in the stop layer, and a depression formed in the leading shield layer. The depression forms a bevel in the shield layer. The bevel has a depth less than the thickness of the leading shield layer. The bevel also has a bevel angle with respect to a normal to the ABS location. The ABS location is the location at which the ABS will be formed. The bevel angle is greater than zero degrees and less than ninety degrees. Step 106 may include masking a portion of the stop layer proximate to the ABS location, then removing the exposed portion of the stop and leading shield layers. In some embodiments, the portion of the stop layer is removed using an ion mill performed at a mill angle from normal to the top surface of the leading shield layer. The milling angle used corresponds to the bevel angle. In some embodiments, the milling angle is greater than the bevel angle.

An intermediate layer is provided over the stop layer, via step 108. The intermediate layer has a substantially flat top surface and fills the depression. In some embodiments, the intermediate layer includes alumina. Also in some embodiments, step 106 includes providing a first layer that refills the depression. The first layer may also be planarized. A flattening mill may also be performed to remove a remaining portion of the stop layer, as well as a portion of the first layer. The top of the first layer is thus coplanar with the top surface of a remaining portion of the leading shield layer outside of the bevel. A second layer is then provided on the first layer. The second layer may reside on the flat surface formed by part of the leading shield layer and the first layer. The first and second layers together form the intermediate layer with a flat top surface. In some embodiments, the first and second layers are formed of the same material. However in other embodiments, the first and second layers may include different materials.

A portion of the intermediate layer is removed via a removal process, in step 110. A trench is thus formed in the intermediate layer. The trench has a profile and a location that correspond to the pole being formed. Thus, the trench may have a top wider than its bottom and is located where the pole is to be formed. For example, an alumina reactive ion etch (RIE) may be performed in step 110 to form the trench. The RIE may terminate in the leading shield layer. Thus, a portion of the leading shield layer may form the bottom of the trench. As a result, the trench bottom may incorporate the bevel.

The pole is provided in the trench, via step 112. Step 112 may include providing one or more nonmagnetic layers in the trench, and then depositing the magnetic layer(s) for the shield. For example sputtering and/or plating may be used for the magnetic layers. Because the bottom of the trench may be formed by the stop layer, the pole has a leading edge bevel corresponding to the bevel in the stop layer. Step 112 may also include planarizing the magnetic transducer as well as performing other processing steps.

A trailing edge bevel may be optionally formed in the pole, via step 114. For example, step 114 may include masking a portion of the pole distal from an air-bearing surface location and milling an exposed portion of the pole.

A capping layer may be provided on the pole, via step 116. The capping layer may be insensitive to a removal process for the remaining portion of the intermediate layer. For example, the capping layer might include a Ta/Ru bilayer. A portion of the intermediate layer is removed, via step 118. In some embodiments, only the portion of the intermediate layer proximate to the ABS location is removed. Because of the presence of the capping layer, the pole may remain untouched by the removal process used in step 118. In some embodiments, all of the intermediate layer surrounding the pole may be removed, for example using a wet etch. Thus, the portion of the intermediate layer closest to the pole and exposed to the etchant is removed. In other embodiments, only a portion of the intermediate layer is removed in step 118, for example using an RIE. In such embodiments, a portion of the intermediate layer closest to the pole may remain.

A wrap-around shield is provided, via step 120. Step 120 thus includes providing side shields adjacent to the sides of the pole as well as a top shield. In embodiments where all of the intermediate layer surrounding the pole proximate to the ABS location is removed, the wrap-around shield provided in step 120 may be a conformal wrap-around shield. Alternatively, a non-conformal wrap around shield may be provided when not all of the intermediate layer surrounding the pole is removed. Processing may then be completed. Subsequent processing of the transducer may include formation of a write gap, formation of layers separating portions of the pole distal from the ABS location from a trailing edge shield, seed layers, a trailing edge shield, and other components.

Figure 4:
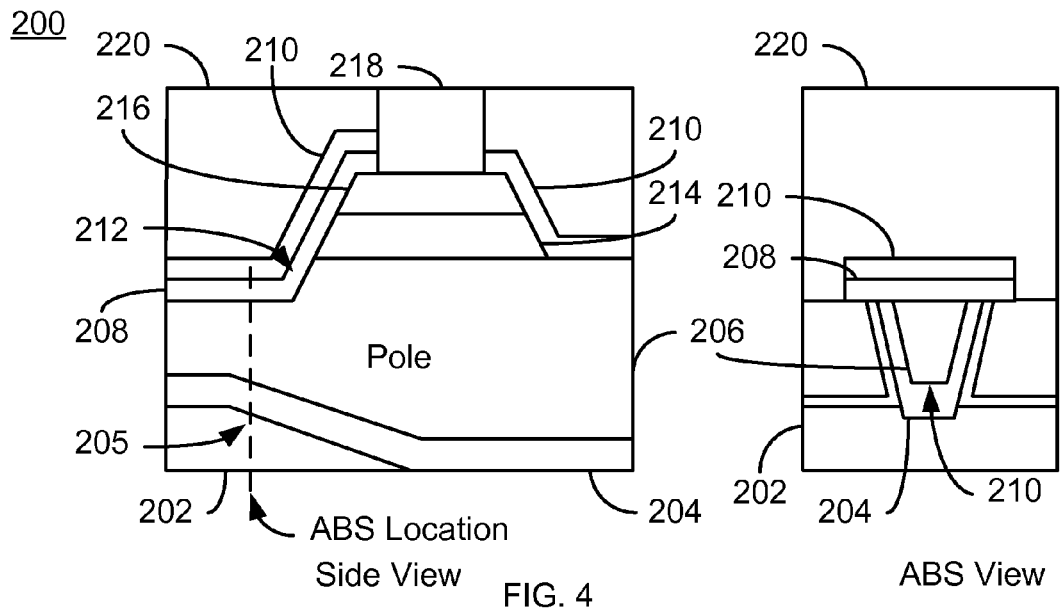
FIG. 4 is a diagram depicting an exemplary embodiment of a PMR transducer.
Figure 5:
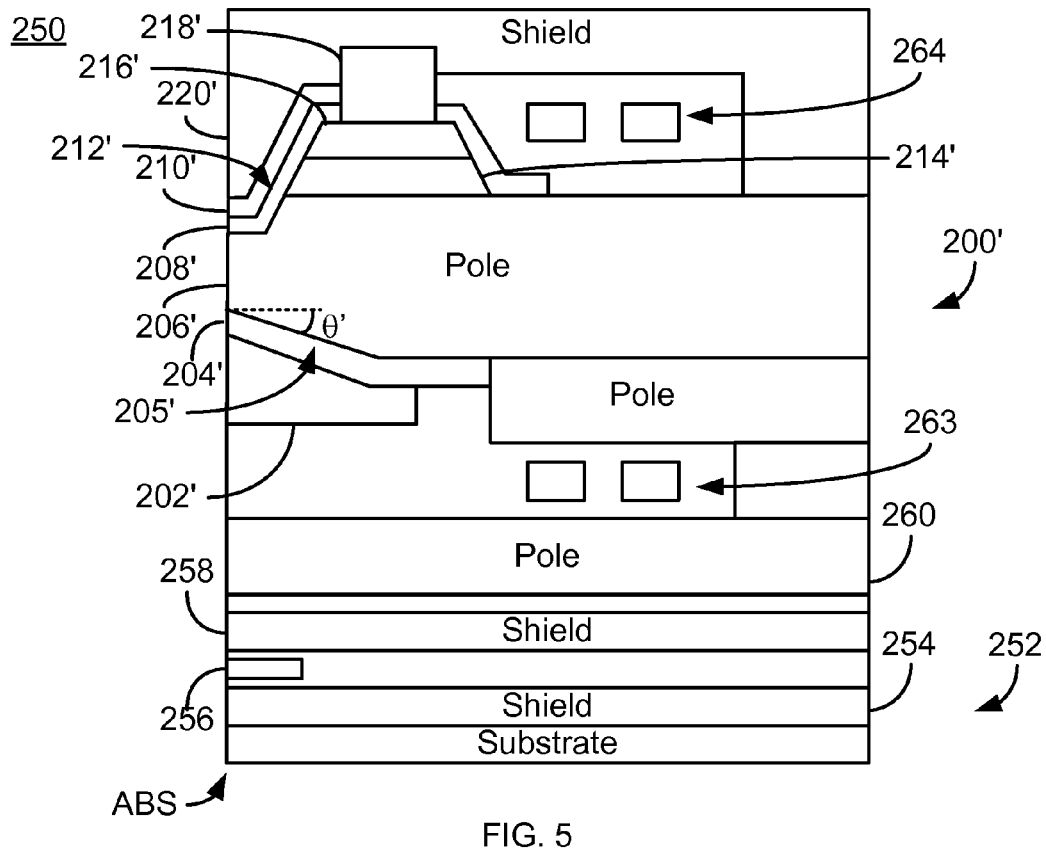
FIG. 5 is a diagram depicting an exemplary embodiment of a PMR head.

FIG. 4 is a diagram depicting an exemplary embodiment of a portion of a PMR transducer 200 that may be formed using the method 100. FIG. 5 depicts a head 250 incorporating the transducer 200. For clarity, FIGS. 4-5 are not to scale. FIG. 4 depicts side and ABS views of the transducer 200, while FIG. 5 depicts a side view only of the head 250. The head 250 shown includes a read transducer 252 and the PMR transducer 200'. However, in another embodiment, the transducer 200/200' may be used in a head including only one or more write transducers 200/200'. The read transducer 252 includes shields 254 and 258 as well as sensor 256. The PMR transducer 200' shown in FIG. 5 includes pole 260, shield 220, and coils 264 in addition to the PMR transducer 200'. The PMR transducer 200/200' includes leading shield 202/202', nonmagnetic layer(s) 204/204', pole 206/206', write gap 208/208', magnetic layer 210/210', nonmagnetic layers 214/214' and 216/216', nonmagnetic plug 218/218', and trailing shield 220/220'. Other and/or different components may be fabricated in other embodiments. The pole 206/206' includes leading edge bevel 205/205' and an optional trailing bevel 212/21'. However, in some embodiments, the trailing edge bevel 212/212' may be omitted. Also shown is the ABS location. For example, in some embodiments, the transducer 200 is lapped to expose the surface of the transducer 200 at the ABS location. The bevel angle, θ, with respect to normal from the ABS location is also shown.

Using the method 100, a leading edge bevel 205/205' may be provided in a pole 208 formed in a trench in an intermediate layer 206. Further, the leading edge bevel 205/205' may be provided in a manner that allows the geometry of the leading edge bevel 205/205' to be controlled. Thus, the desired shape of the pole 206/206' may thus be easier to achieve. Consequently, performance of the pole 206/206' fabricated using the method 100 may be improved. Further, other components of the transducer 200/200' may be fabricated in conjunction with the leading edge bevel 205/250' to further enhance performance of the transducer 200/200'. This improvement might be achieved while utilizing existing process modules.

Figure 6:
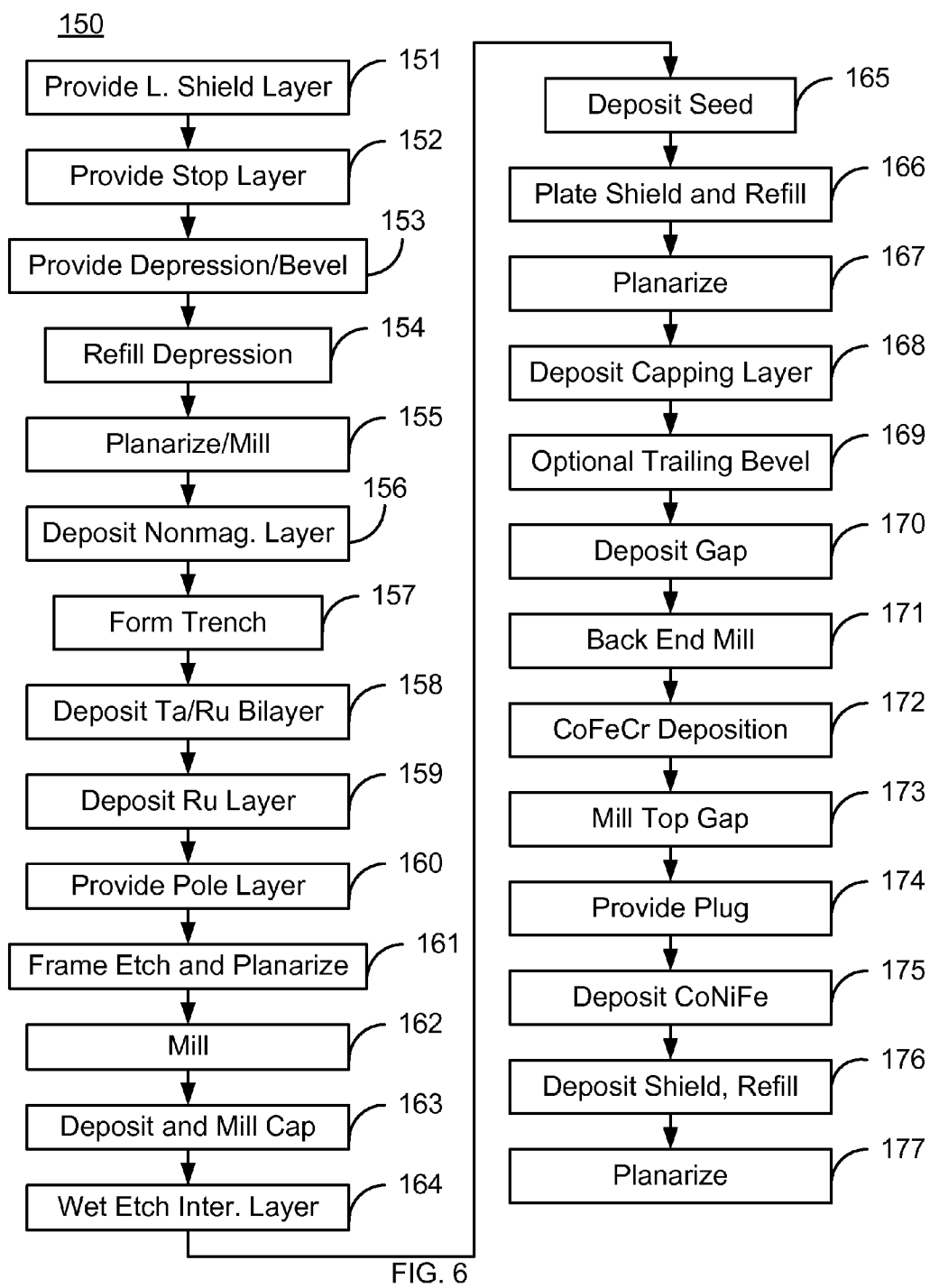
FIG. 6 is a flow chart depicting another exemplary embodiment of a method for fabricating a PMR transducer.

FIG. 6 is a flow chart depicting another exemplary embodiment of a method 150 for fabricating a PMR transducer. For simplicity, some steps may be omitted. FIGS. 7-25 are diagrams depicting side and ABS views of an exemplary embodiment of a portion of a PMR transducer during 300 fabrication. For clarity, FIGS. 7-25 are not to scale. Further, although FIGS. 7-25 depict the ABS location and ABS at a particular point in the pole, other embodiments may have other locations for the ABS. Referring to FIGS. 6-25, the method 150 is described in the context of the PMR transducer 300. However, the method 150 may be used to form another device (not shown). The PMR transducer 300 being fabricated may be part of a merged head that also includes a read head (not shown in FIGS. 7-25) and resides on a slider (not shown) in a disk drive. The method 150 also may commence after formation of other portions of the PMR transducer 300. The method 150 is also described in the context of providing a single PMR transducer 300. However, the method 150 may be used to fabricate multiple transducers at substantially the same time. The method 150 and device 300 are also described in the context of particular layers. However, in some embodiments, such layers may include multiple sublayers.

A leading shield layer is deposited on a flat, planarized surface, via step 151. For example, a NiFe layer may be deposited on a surface that has undergone a CMP. The thickness of the NiFe layer is greater than the depth of the bevel desired to be provided in the pole. A planarization stop layer is deposited on the underlayer, via step 152. In some embodiments, step 152 may include depositing a bi-layer of Ta/Ru. However, in other embodiments, other materials, such as Ta, Cr, and Ru might be used.

Figure 7:
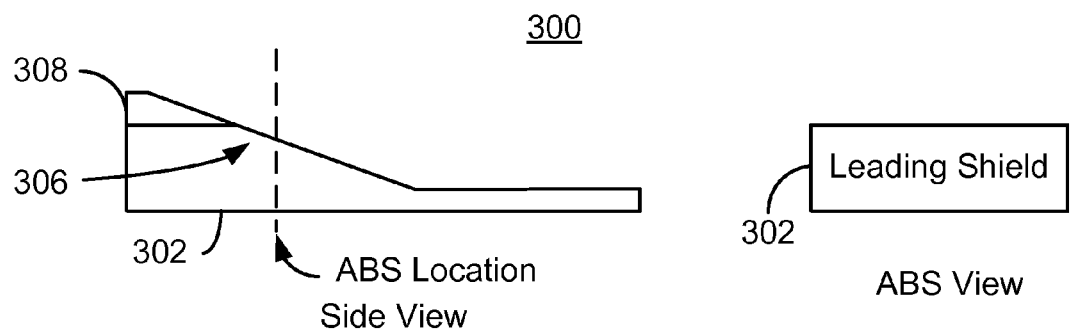
FIGS. 7-25 are diagrams depicting an exemplary embodiment of a perpendicular magnetic recording transducer during fabrication.

An aperture in the planarization stop layer and a depression in the leading shield layer are provided, via step 153. Thus, a bevel may be formed in the leading shield. Step 153 may be performed by providing a mask, then performing an ion mill. The mask covers a portion of the stop layer proximate to the ABS location. FIG. 7 depicts the transducer 300 after step 153 is performed. Thus, the leading shield layer 302 and remaining portion of the stop layer 308 are shown. Also shown is the bevel 306 formed in the leading shield layer 302.

Figure 8:
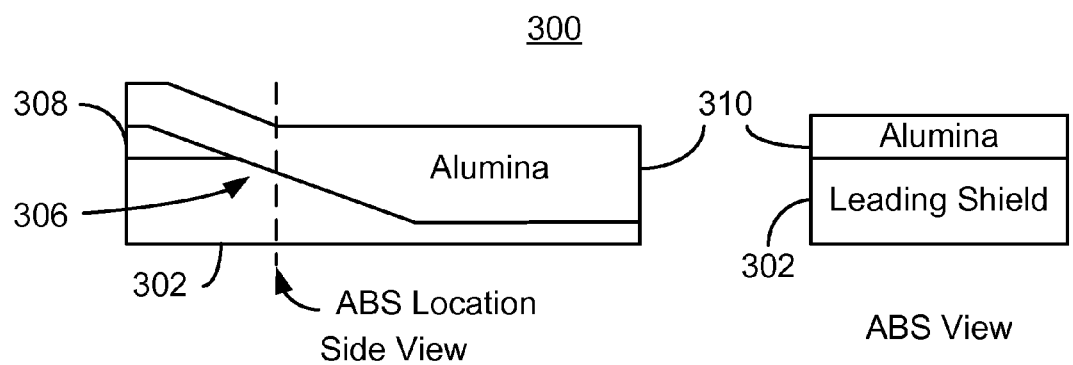

The depression in the leading shield layer 302 is refilled, via step 154. In some embodiments, step 154 includes depositing a nonmagnetic refill material, such as alumina. FIG. 8 depicts the transducer 300 after step 154 is completed. Thus, the alumina refill material 310 is shown. The alumina 310 covers both the leading shield layer 302 and the remaining portion of the planarization stop layer 308.

Figure 9:
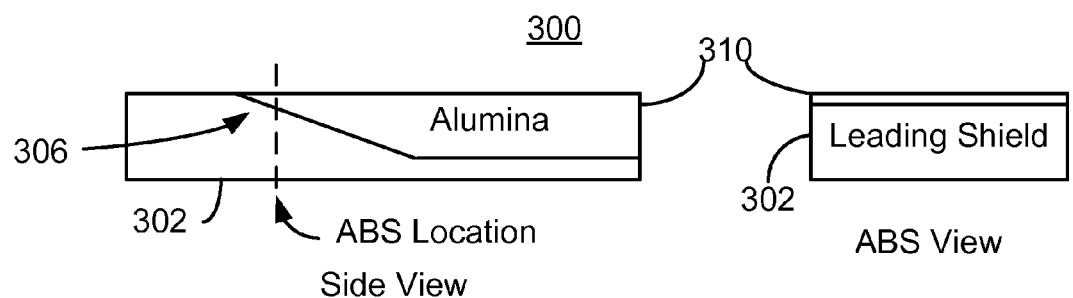

The transducer is then planarized and, in some embodiments, milled, via step 155. For example, a CMP may be performed. Typically a portion of the planarization stop layer 308 remains after the CMP is completed. A flattening mill may also be performed as part of step 155. The flattening mill may remove the remaining portion of the planarization stop layer and part of the refill material. FIG. 9 depicts the transducer 200 after step 155 is performed. Thus, the leading shield layer 302 has a top that is substantially coplanar with the alumina refill material 310.

Figure 10:
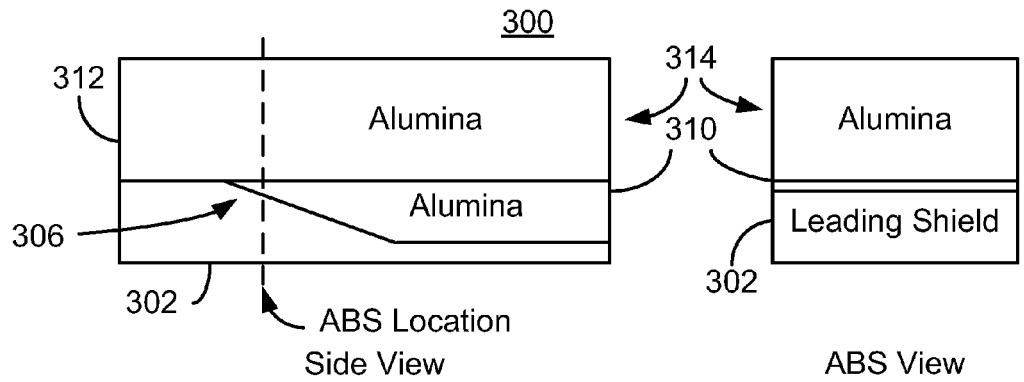

An additional nonmagnetic layer is deposited, via step 156. The refill material deposited in step 153 and the additional nonmagnetic layer provided in step 156 together may be considered to form an intermediate layer. Because the additional nonmagnetic layer provided in step 156 is deposited on a flat surface, the top surface of the additional nonmagnetic layer, and thus the intermediate layer, is substantially flat. In some embodiments, the additional nonmagnetic layer provided in step 156 is the same as the refill material provided in step 154. For example, both may include alumina. However, in other embodiments, the materials may differ. FIG. 10 depicts the transducer 300 after step 156 is performed. Thus, the additional nonmagnetic material 312 is shown. In the embodiment depicted, both the refill material 310 and the additional nonmagnetic layer 312 together from the intermediate layer 314. Hereinafter, layers 310 and 312 are referred to as the intermediate layer 314.

Figure 11:
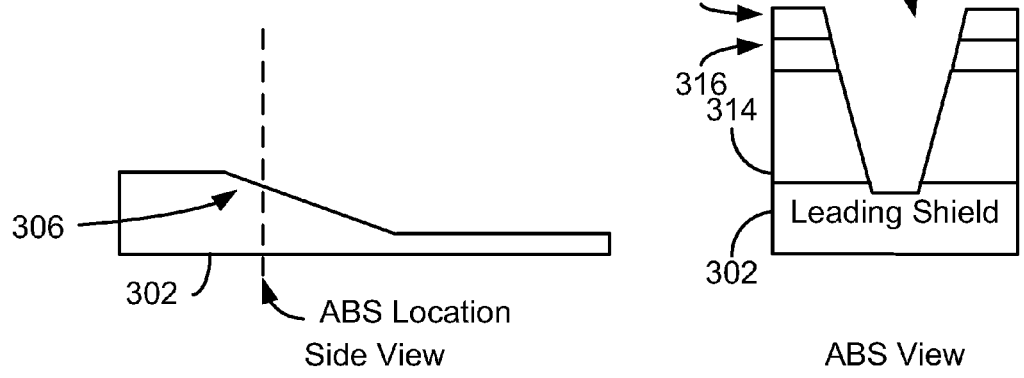

A trench is then formed in the intermediate layer 314, via step 157. Step 157 includes providing a mask having an aperture therein. In some embodiments, the mask includes a hard mask having one or more layers. The aperture corresponds to the location and footprint of the trench. The trench may be formed, for example by an alumina RIE. FIG. 11 depicts the transducer 300 after step 157 has been performed. Thus, a mask having layers 316 and 318 is shown. For example, layer 316 may be a Ta/Ru bilayer, while layer 318 may include Ru. Thus, the layers 316 and 318 form a hard mask having an aperture (not labeled in FIG. 11) above a trench 320. A trench 320 has been formed in the intermediate layer 314 in step 157. Because the trench 280 is formed in the region shown in the side view of FIG. 11, only the remaining leading shield layer 302 is shown. In the embodiment shown, the leading shield layer 302 forms the bottom of the trench 320. The trench 320 has a profile and location corresponding to the pole to be formed. Thus, the top of the trench 320 is wider than the bottom. In addition, the bottom of the trench 320 includes the bevel 306 in the leading shield layer 302.

Figure 12:
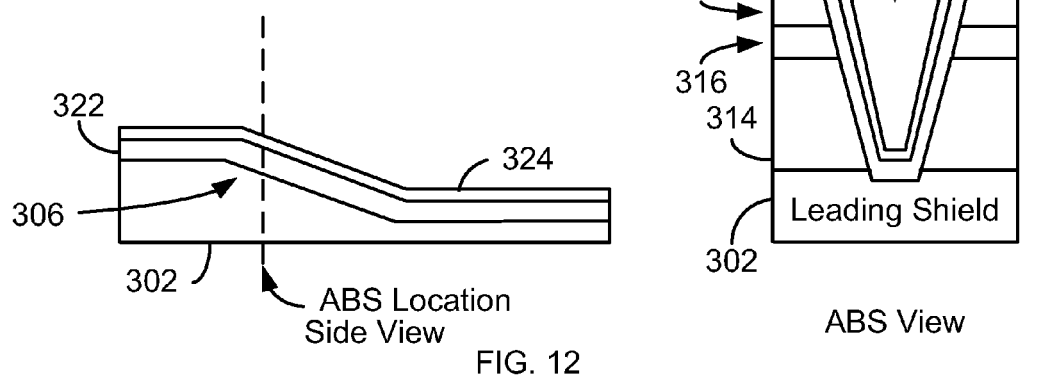

Nonmagnetic layers are deposited in steps 158 and 159. For example, in the embodiment shown in FIG. 6, a Ta/Ru bilayer is deposited in step 158, while a Ru layer is deposited using chemical vapor deposition (CVD) in step 159. FIG. 12 depicts the transducer 300 after step 159 is performed. Thus, layers 322 and 324 are shown. Layer 322 is a Ta/Ru bilayer including a Ta layer and a first Ru layer, while layer 324 is a second Ru layer. The layers 322 and 324 are conformal and thus follow the profile of the trench 320, including the bevel 306.

Figure 13:
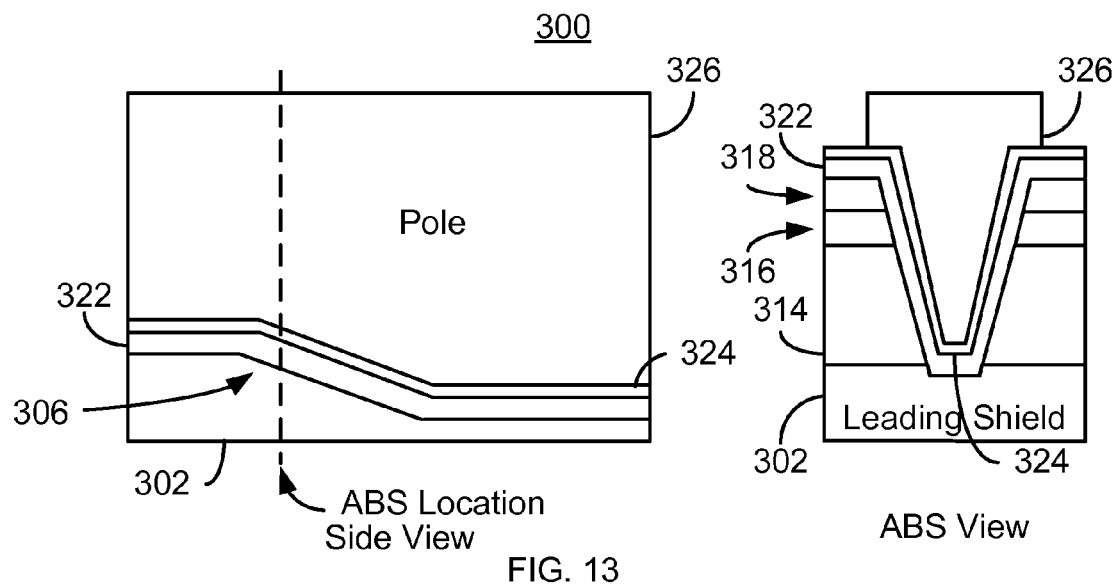
Figure 14:
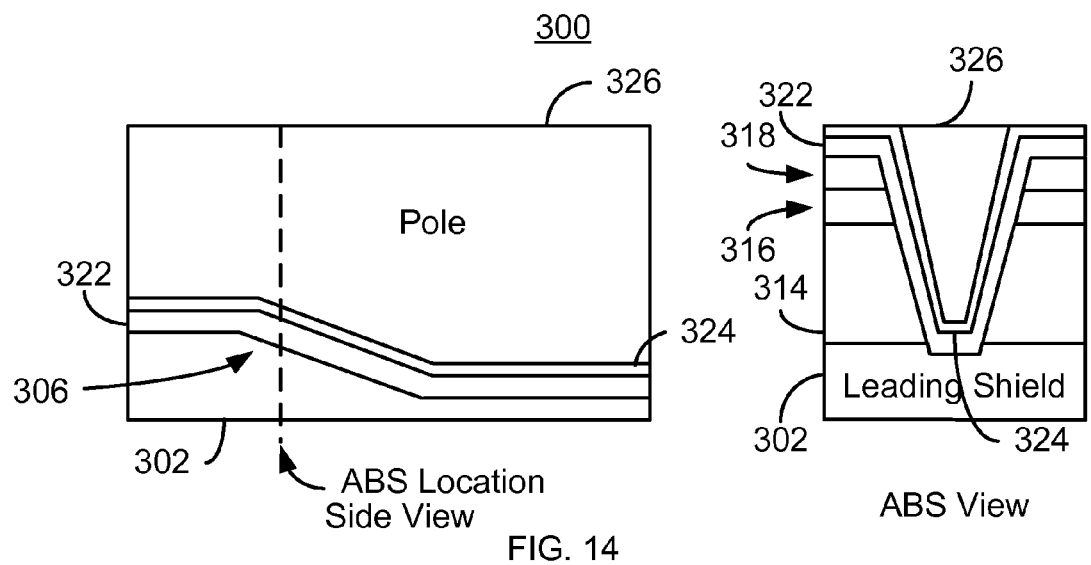

The magnetic material(s) for the pole are deposited, via step 160. Step 160 thus includes providing one or more layers. For example, CoNiFe may be plated in step 160. In other embodiments, different deposition techniques and/or materials may be used. In some embodiments, the full film is plated in step 160. Thus, a frame may be provided and portions of the full film etched in step 161. In addition, the transducer may be planarized in step 161. In some embodiments, a CMP is performed in step 161. FIG. 13 depicts the transducer 300 after the etch is performed in step 161. Thus, the pole materials 326 have been deposited. In addition, as can be seen in the ABS view, portions of the film have been removed. FIG. 14 depicts the transducer 300 after step 161 is completed. Thus, the transducer 300 has been planarized. The top of the pole materials 326 are thus substantially coplanar with the tops of the nonmagnetic layer 324. Further, the pole 326 also has a bevel 306 corresponding to the bevel in the leading shield layer 302.

Figure 15:
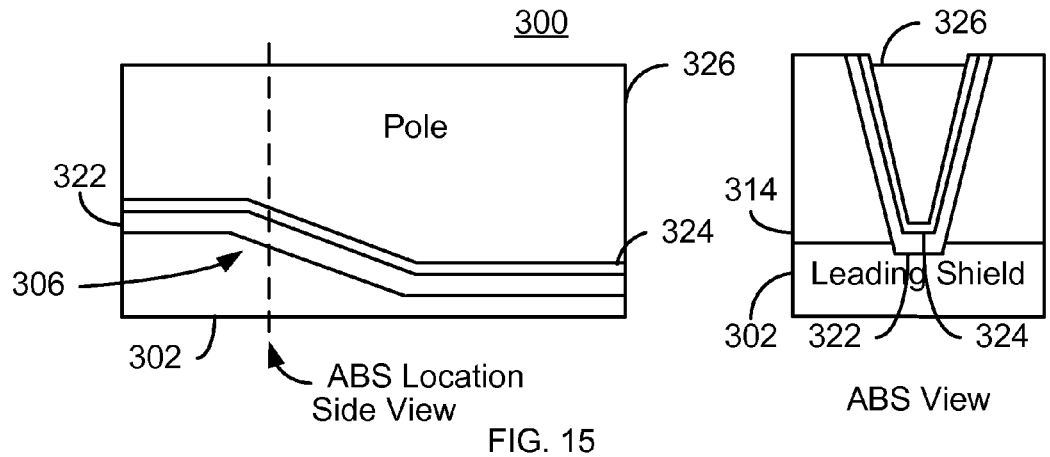
Figure 16:
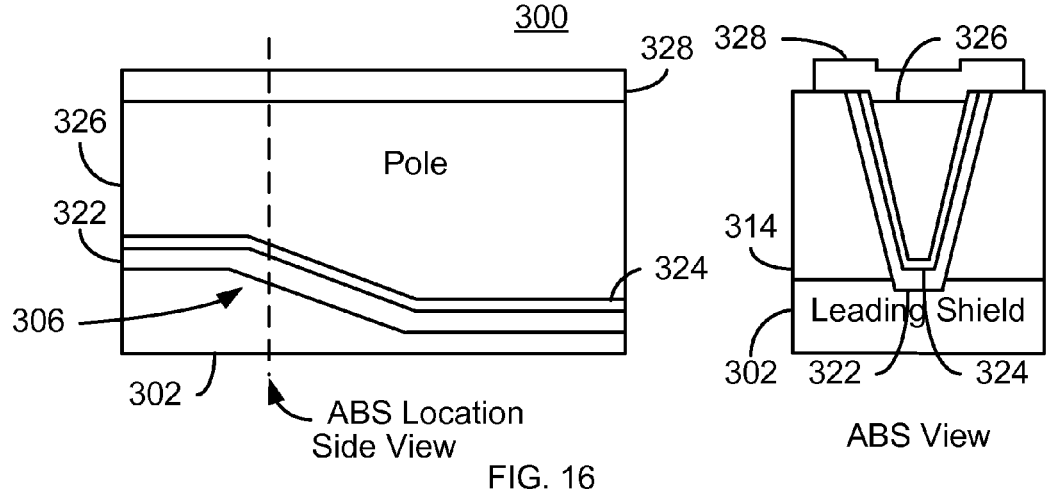

A mill may be performed, via step 162. The mill removes the portion of the nonmagnetic layers 322 and 324 outside of the trench. FIG. 15 depicts the transducer after step 162 has been performed. A capping layer may be deposited and shaped, via step 163. For example, a Ta/Ru capping layer may be deposited as a full film. The portions of the capping layer distal from the pole 326 are removed in step 163. FIG. 16 depicts the transducer 300 after step 163 is performed. Thus, the capping layer 328 has been provided. In addition, because a portion of the capping layer 328 has been milled, the capping layer 328 does not extend across the entire ABS.

Figure 17:
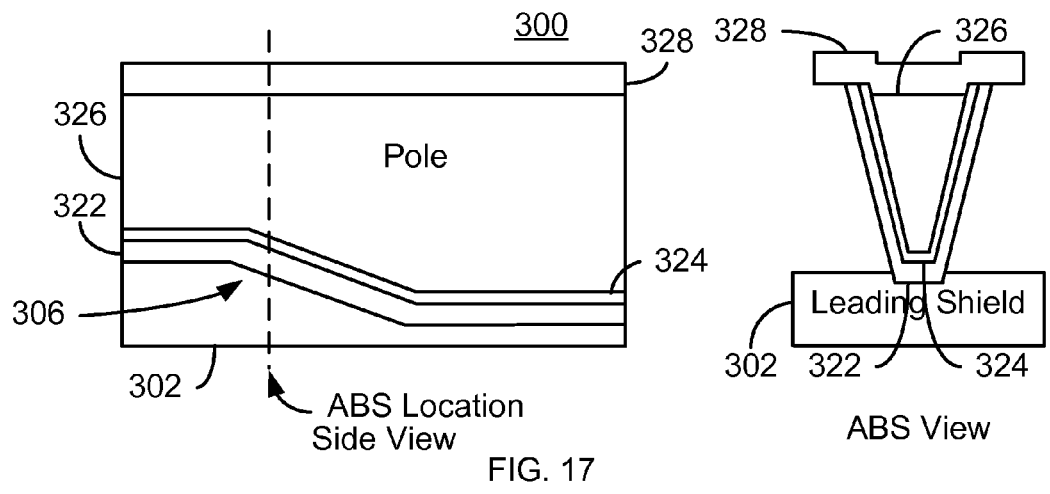

The transducer is wet etched, via step 164. For example, one or more solvents appropriate for the intermediate layer 314 are used in step 164. Thus, the portion of the intermediate layer 314 proximate to the ABS location and adjoining the nonmagnetic layers 322/324 is removed. FIG. 17 depicts the transducer 300 after step 164 is completed. Thus, the intermediate layer 314 has been removed.

Figure 18:
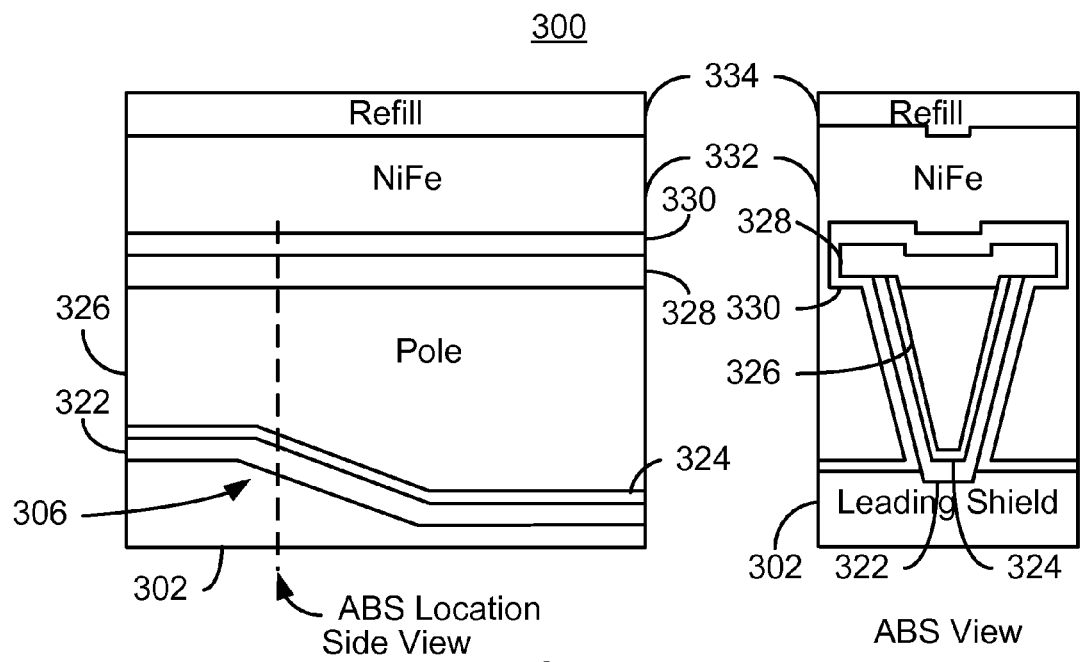

A seed layer is deposited, via step 165. For example, a NiFe seed layer may be deposited using ion beam deposition. A magnetic shield layer is also plated, via step 166. For example, NiFe may be plated. Also in step 166 a fill layer is deposited. In some embodiments, alumina may be plated as the fill layer. FIG. 18 depicts the transducer 300 after step 166 is completed. Thus, a magnetic layer 332 and a refill layer 334 are shown. Also shown is the seed layer 330. The seed layer 330 and magnetic layer 332 adjoin the nonmagnetic layers 322 and 324 at the sides of the pole 326. The seed layer 330 is between the magnetic layer 332 and the nonmagnetic layers 322 and 324. The magnetic layer 332 forms the side shields for the transducer 300.

Figure 19:
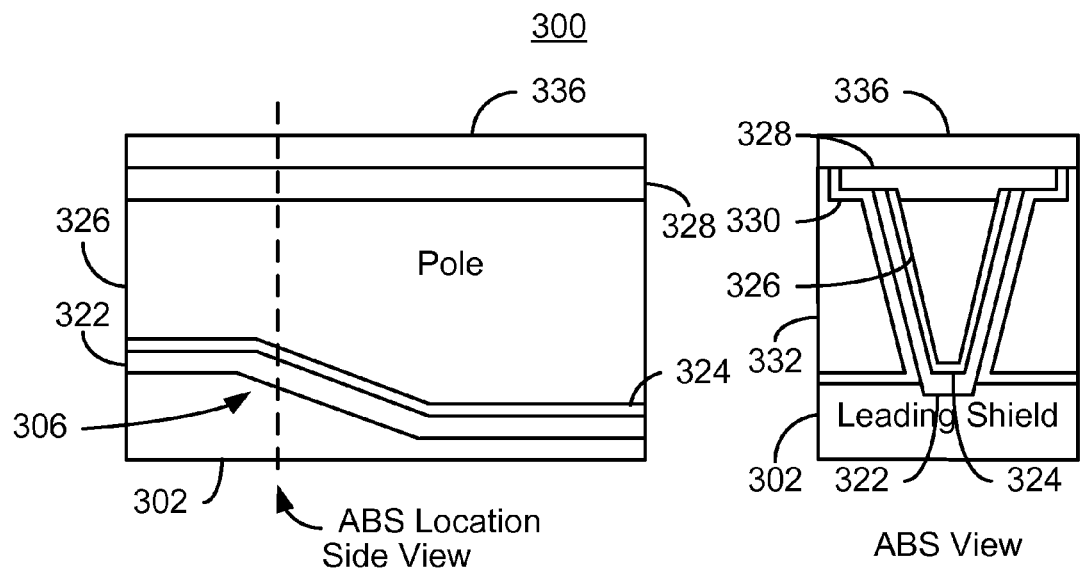

The transducer is planarized, via step 167. For example, a CMP may be performed. Steps 165-167 may thus be considered to form the side shields. An additional nonmagnetic capping layer is then deposited, via step 168. For example, a Ti/Alumina bilayer may be deposited in step 168. FIG. 19 depicts the transducer 300 after step 168 is performed. Because a CMP has been performed, the first capping layer 328 has a flat top substantially coplanar with the remaining portion of the shield material 332. Side shields 332 have also been formed. In addition, the additional capping layer 336 is shown. As discussed above, the additional capping layer 336 may include a bilayer such as Ti/alumina.

Figure 20:
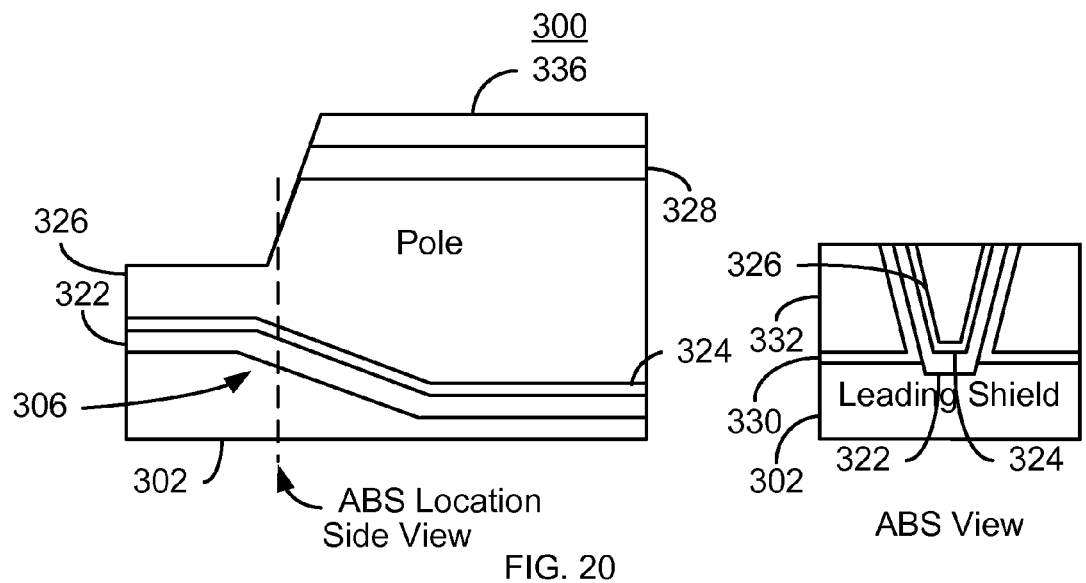

A trailing edge bevel may optionally be formed, via step 169. In some embodiments, step 169 includes providing a mask having an aperture proximate to the ABS location. An ion mill may then be used to remove a portion of the pole material(s) 326 exposed by the aperture in the mask. In addition, the portion of the capping layer 328 and the additional capping layer 332 are removed during formation of the bevel in step 169. The mask may then be stripped. FIG. 20 depicts the transducer 200 after step 169 is performed. Thus, the pole 326 may include leading and trailing bevels. As can be seen in FIG. 20, only a portion of the capping layers 328 and 336 remain.

Figure 21:
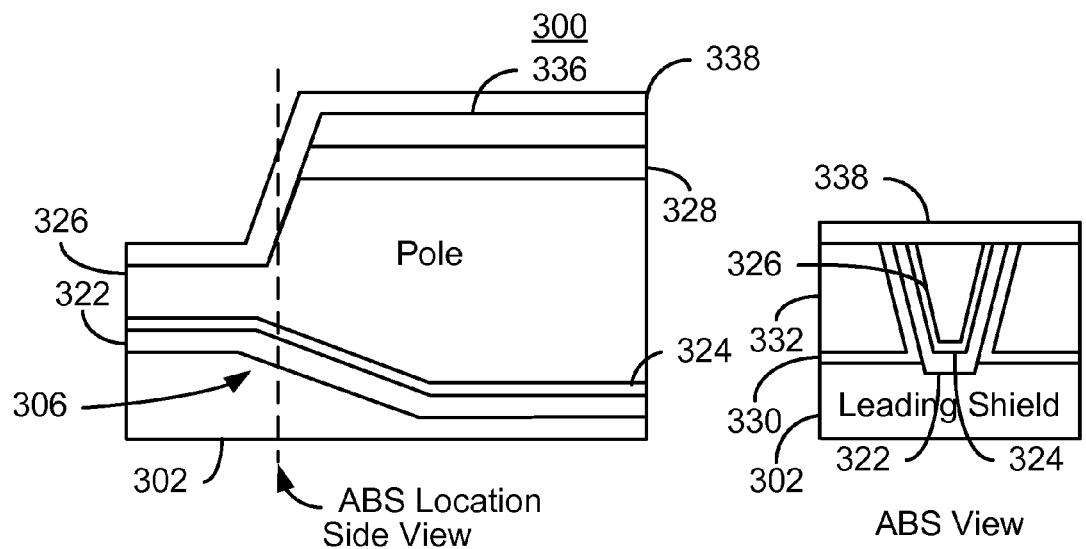

A write gap may be deposited, via step 170. For example, step 170 may include providing a layer of alumina using atomic layer deposition. FIG. 21 depicts the transducer 200 after step 170 is performed. Thus, a gap layer 338 is shown.

Figure 22:
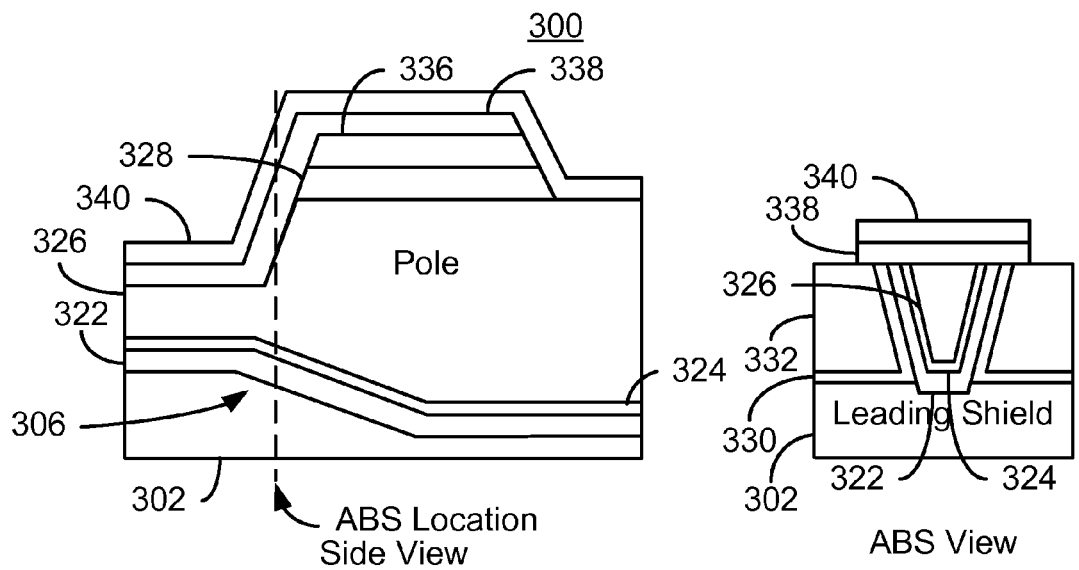

A back end mill may be performed, via step 170. Thus, portions of the gap layer 338 and capping layers 328 and 336 may be removed distal from the ABS location. A CoFeCr layer may also be deposited after the back end mill is performed, via step 172. FIG. 22 depicts the transducer after steps 170-172 are performed. Thus, the layers 328, 336, and 338 no longer extend to the back of the pole 326. Further, CoFeCr layer 340 is deposited.

Figure 23:
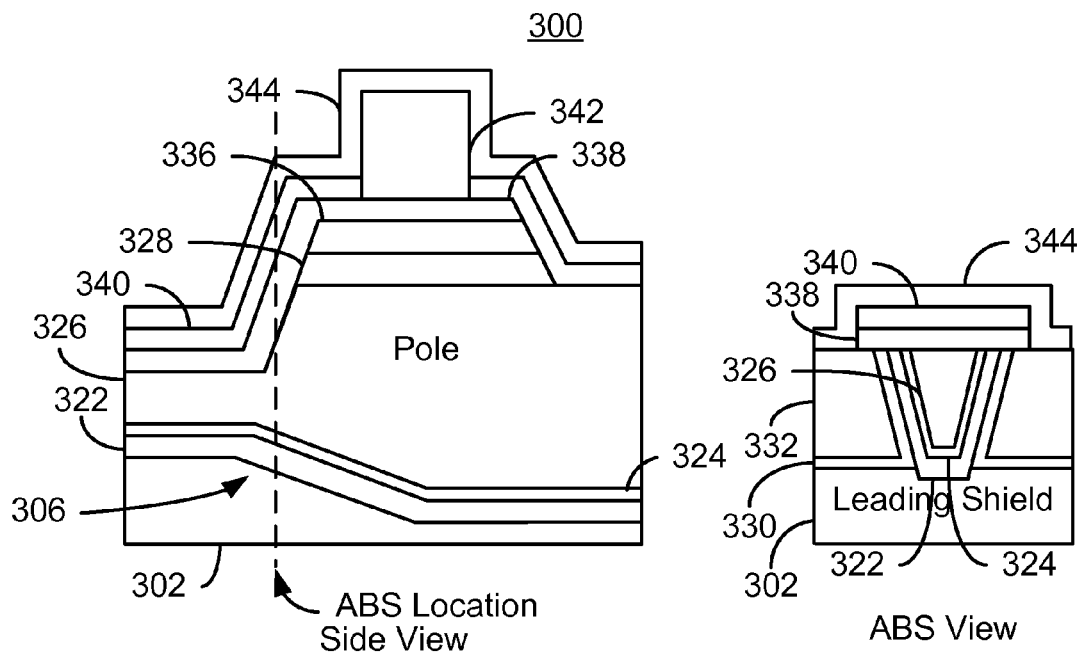

A top gap mill is performed, via step 173. Thus, through step 173, portions of the gap layer 338 and CoFeCr layer 340 residing on the layers 328 and 336 are removed. A plug is provided in the aperture formed in step 173, via step 174. The plug provided is nonmagnetic. In addition, a CoNiFe layer is deposited, via step 175. In some embodiments, the CoNiFe is a seed layer. FIG. 23 depicts the transducer 200 after step 175 is performed. Thus, the plug 342 and CoNiFe seed layer 344 are shown. The CoNiFe layer 344 is conformally deposited. Thus, portions of the CoNiFe layer 344 on the plug are substantially vertical (and thus parallel to the ABS location. Thus, the high moment seed layer 344 may be provided on a vertical surface.

Figure 24:
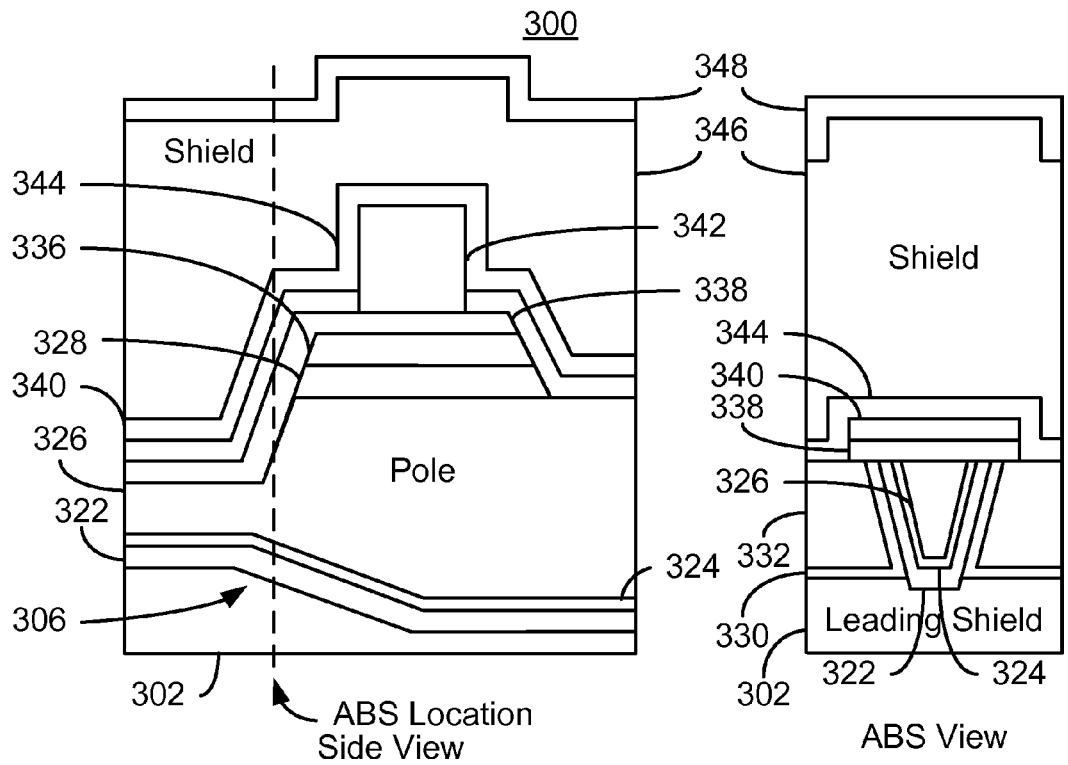
Figure 25:
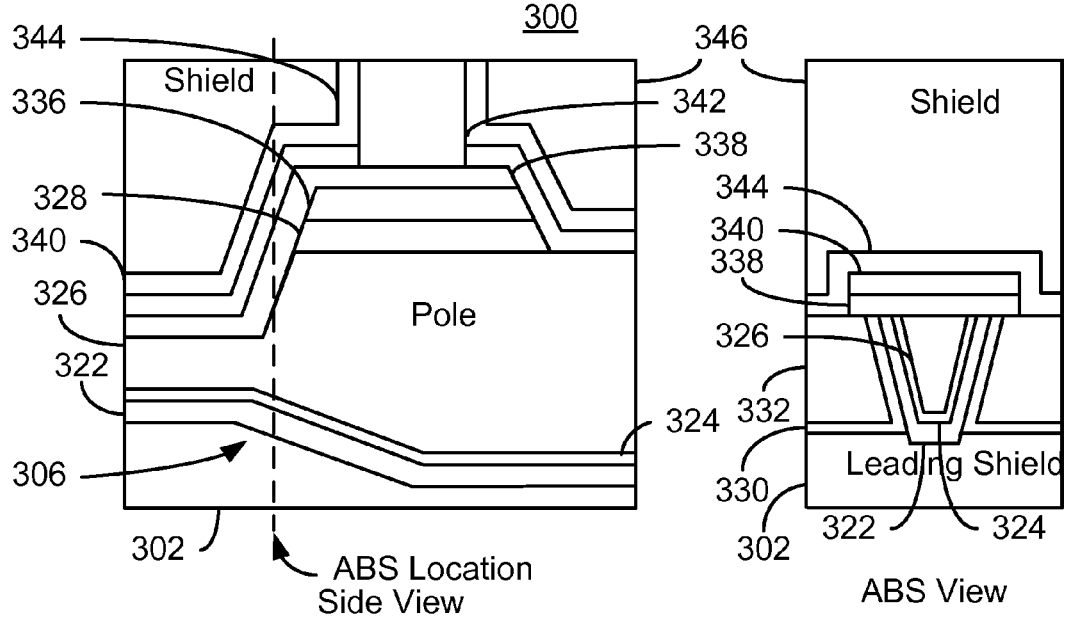

Shield and refill materials are deposited, via step 176. FIG. 24 depicts the transducer 300 after step 176. Thus, shield materials 346 and refill materials 348 are shown. The shield materials 326 may include CoNiFe, while the refill materials may include alumina. The transducer is also planarized, via step 177. Steps 175-177 may thus be considered to form a top shield. FIG. 25 depicts the transducer 300.

Thus, using the method 150, the PMR transducer 300 may be formed. More specifically, pole 326 having a leading edge bevel 306, was well as an optional trailing edge bevel, and may be manufactured. The leading edge bevel 306 may be independently controlled. Further, the desired geometry of the transducers 300 may be achieved. For example, the high moment seed layer 344 may improve flux concentration. This geometry may be achieved using well understood process modules. Using the method 150, therefore, the transducer 300 having improved performance may be fabricated.

Figure 26:
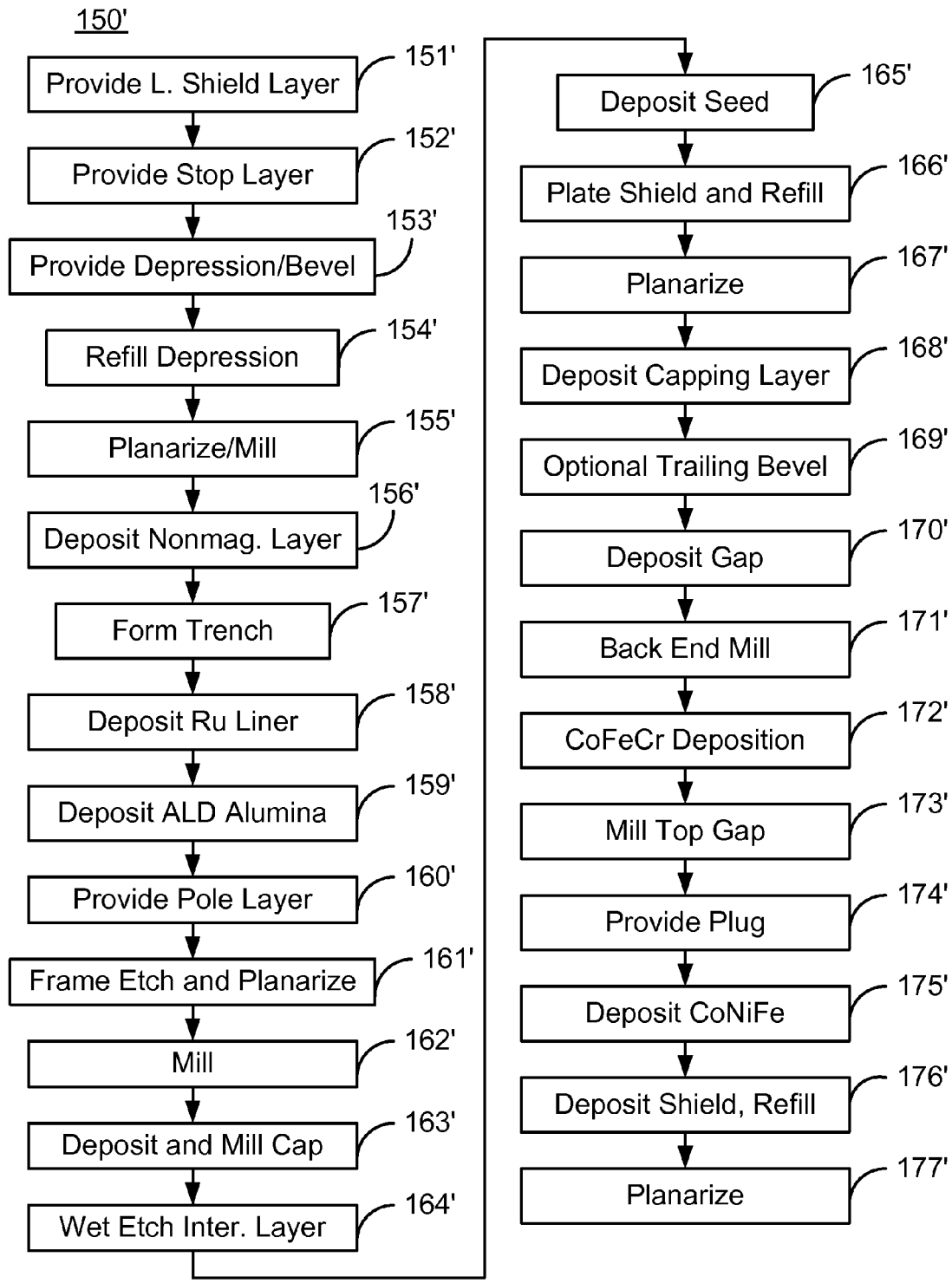
FIG. 26 is a flow chart depicting another exemplary embodiment of a method for fabricating a PMR transducer.

FIG. 26 is a flow chart depicting another exemplary embodiment of a method 150' for fabricating a PMR transducer. For simplicity, some steps may be omitted. FIGS. 27-32 are diagrams depicting side and ABS views of an exemplary embodiment of a portion of a PMR transducer during 300' fabrication. For clarity, FIGS. 27-32 are not to scale. Further, although FIGS. 27-32 depict the ABS location and ABS at a particular point in the pole, other embodiments may have other locations for the ABS. Referring to FIGS. 26-32, the method 150' is described in the context of the PMR transducer 300'. However, the method 150' may be used to form another device (not shown). The PMR transducer 300' being fabricated may be part of a merged head that also includes a read head (not shown in FIGS. 26-32) and resides on a slider (not shown) in a disk drive. The method 150' also may commence after formation of other portions of the PMR transducer 300'. The method 150' is also described in the context of providing a single PMR transducer 300'. However, the method 150' may be used to fabricate multiple transducers at substantially the same time. The method 150' and device 300' are also described in the context of particular layers. However, in some embodiments, such layers may include multiple sublayers. The method 150' is analogous to the method 150. Similarly, the transducer 300' is analogous to the transducer 300. Analogous steps and components are labeled similarly. Thus, only portions of the method 150' and transducer 300' are discussed.

Figure 27:
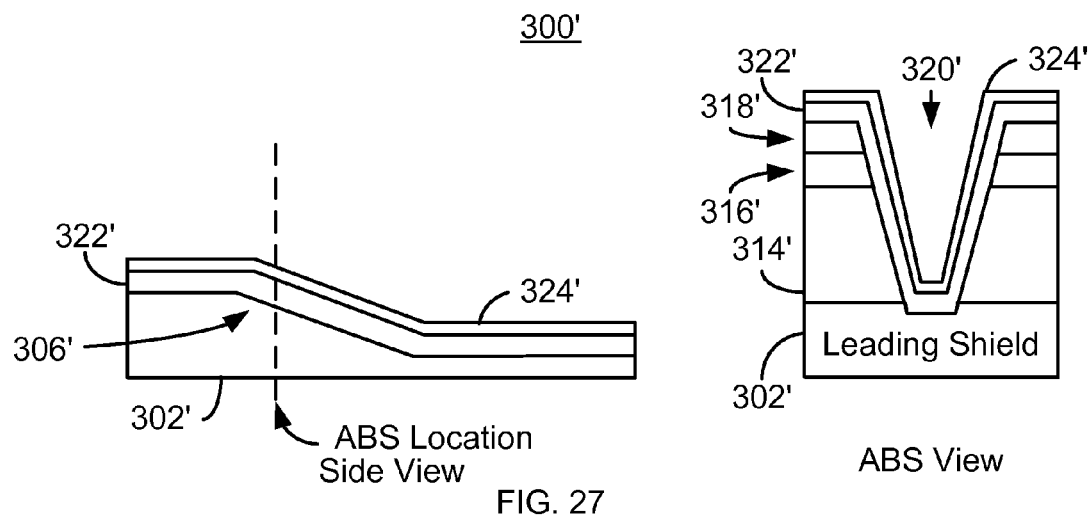
FIGS. 27-32 are diagrams depicting an exemplary embodiment of a perpendicular magnetic recording transducer during fabrication.

Steps 151'-157' are analogous to step 151-157. Thus, FIG. 27 depicts the transducer 300' after step 157' is performed. Thus, the leading shield layer 302' and remaining portion of the stop layer 308' are shown. Also shown is the bevel 306' formed in the leading shield layer 302'. Nonmagnetic layers are deposited in steps 158' and 159'. In the embodiment shown, a Ru liner is deposited in step 158'. In addition, an alumina layer is deposited via ALD in step 159'. FIG. 27 depicts the transducer 300' after step 159' is performed. Thus, leading shield layer 302' and intermediate layer 314'having trench 320' therein are shown. Also sown are hard mask layers 316' and 318'. Further, a Ru liner 322' and ALD alumina layer 324' are shown.

Figure 28:
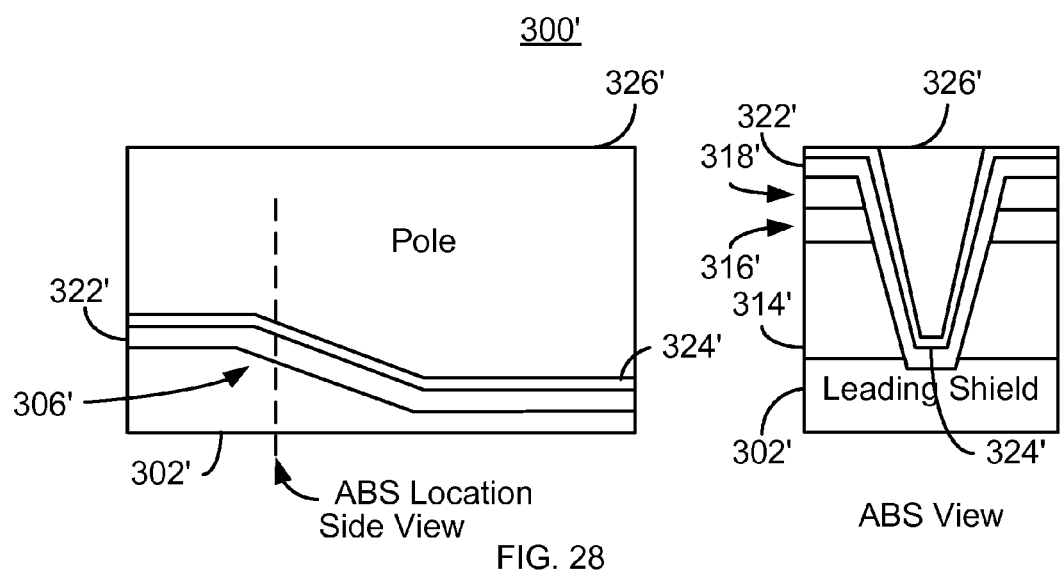

Steps 160'-161' are analogous to step 160-161. FIG. 28 depicts the transducer 300' after the etch is performed in step 161'. Thus, the pole materials 326' have been deposited. In addition, as can be seen in the ABS view, portions of the film have been removed. Further, the transducer 300' has been planarized. The top of the pole materials 326' are thus substantially coplanar with the tops of the ALD alumina layer 324'. The pole 326' also has a bevel 306' corresponding to the bevel in the leading shield layer 302'.

Figure 29:
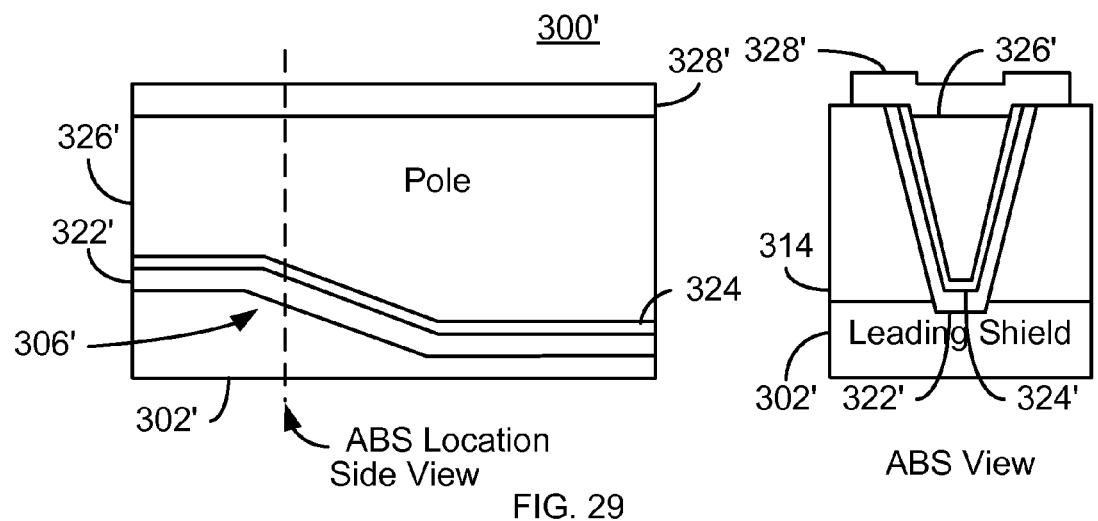

Steps 162' and 163' are analogous to step 162 and 163. FIG. 29 depicts the transducer 300' after step 163' is performed. Thus, the capping layer 328' has been provided. In addition, because a portion of the capping layer 328' has been milled, the capping layer 328' does not extend across the entire ABS.

Figure 30:
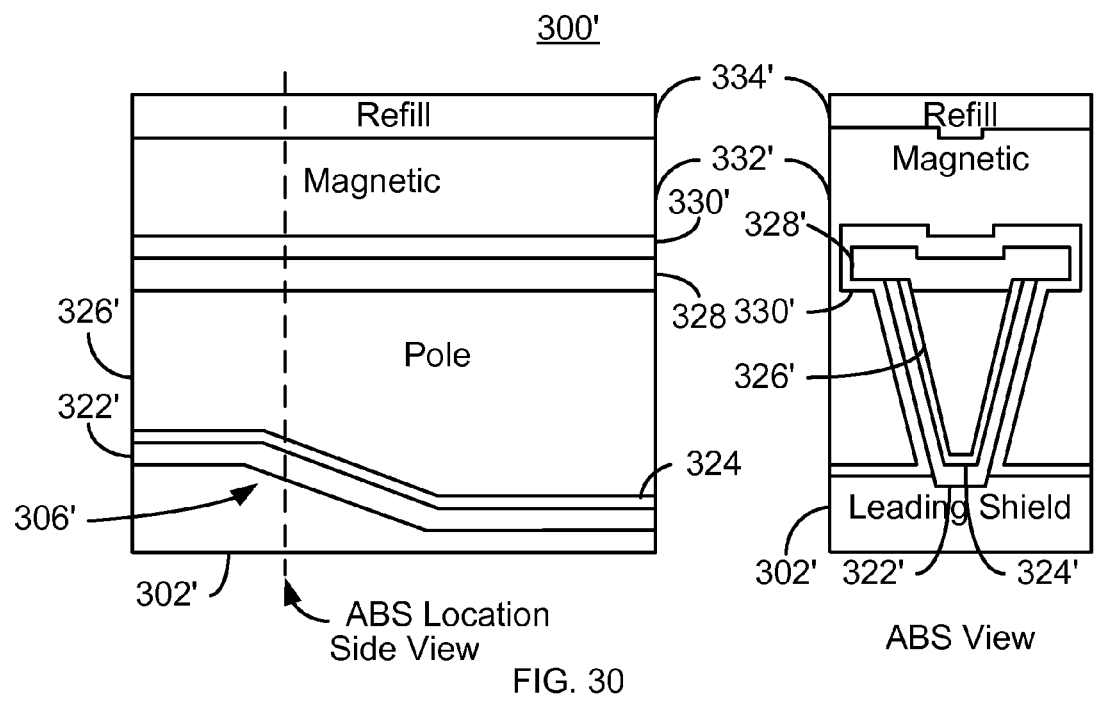
Figure 31:
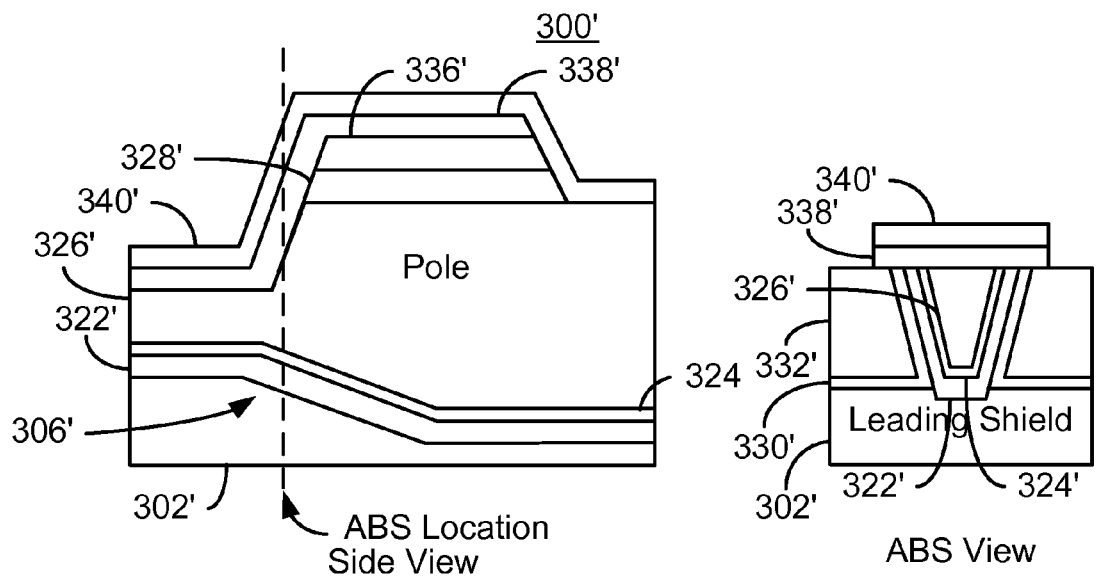

Steps 164'-166' are analogous to steps 164-166. FIG. 30 depicts the transducer 300' after step 166' is completed. Thus, a seed layer 330', a magnetic layer 332', and a refill layer 334' are shown. The magnetic layer 332' forms the side shields for the transducer 300.

Steps 167'-172' are analogous to steps 167-172. FIG. 22 depicts the transducer after steps 167'-172' are performed. Thus, an optional top bevel is formed in the pole 326' and a gap layer 338' are provided. In addition, the capping layers 328' and 336', as well as gap layer 338', no longer extend to the back of the pole 326'. Further, the CoFeCr layer 340' is deposited.

Figure 32:
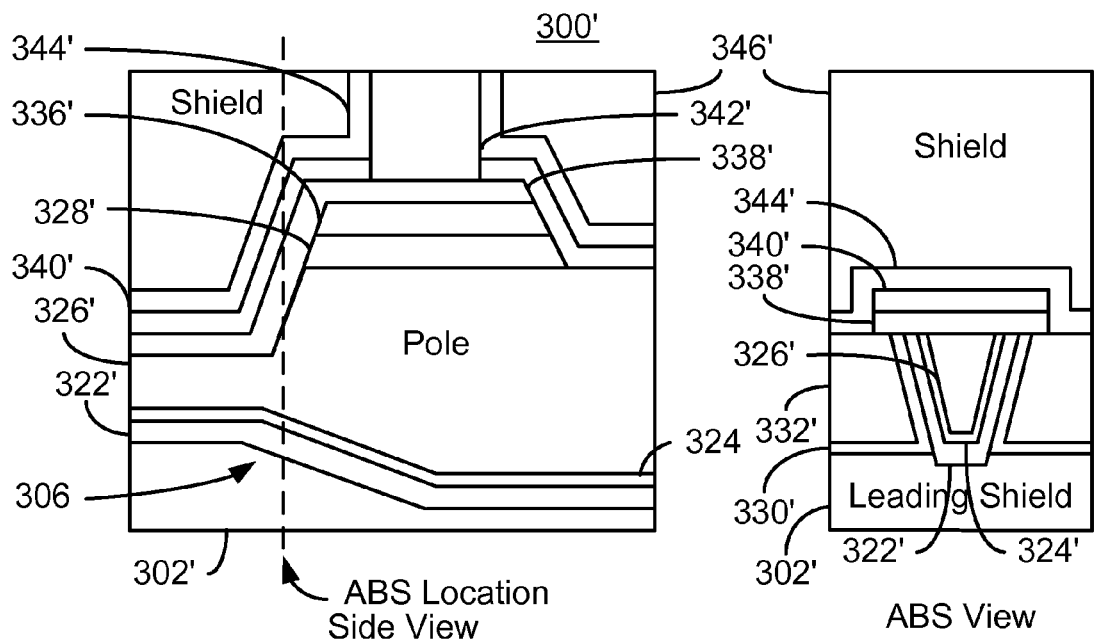

Steps 173'-177' are analogous to steps 173-177. Thus, FIG. 32 depicts the transducer 300' after step 177' is completed. Thus, the nonmagnetic plug 342', CoFeNi seed 344', and shield 346' are shown.

Using the method 150', the PMR transducer 300' may be formed. The transducer 300' shares the benefits of the transducer 300. In addition, because a Ru liner 322' in conjunction with an alumina layer 324' is used, the cost of the transducer 300' may be reduced over that of the transducer 300.

Figure 33:
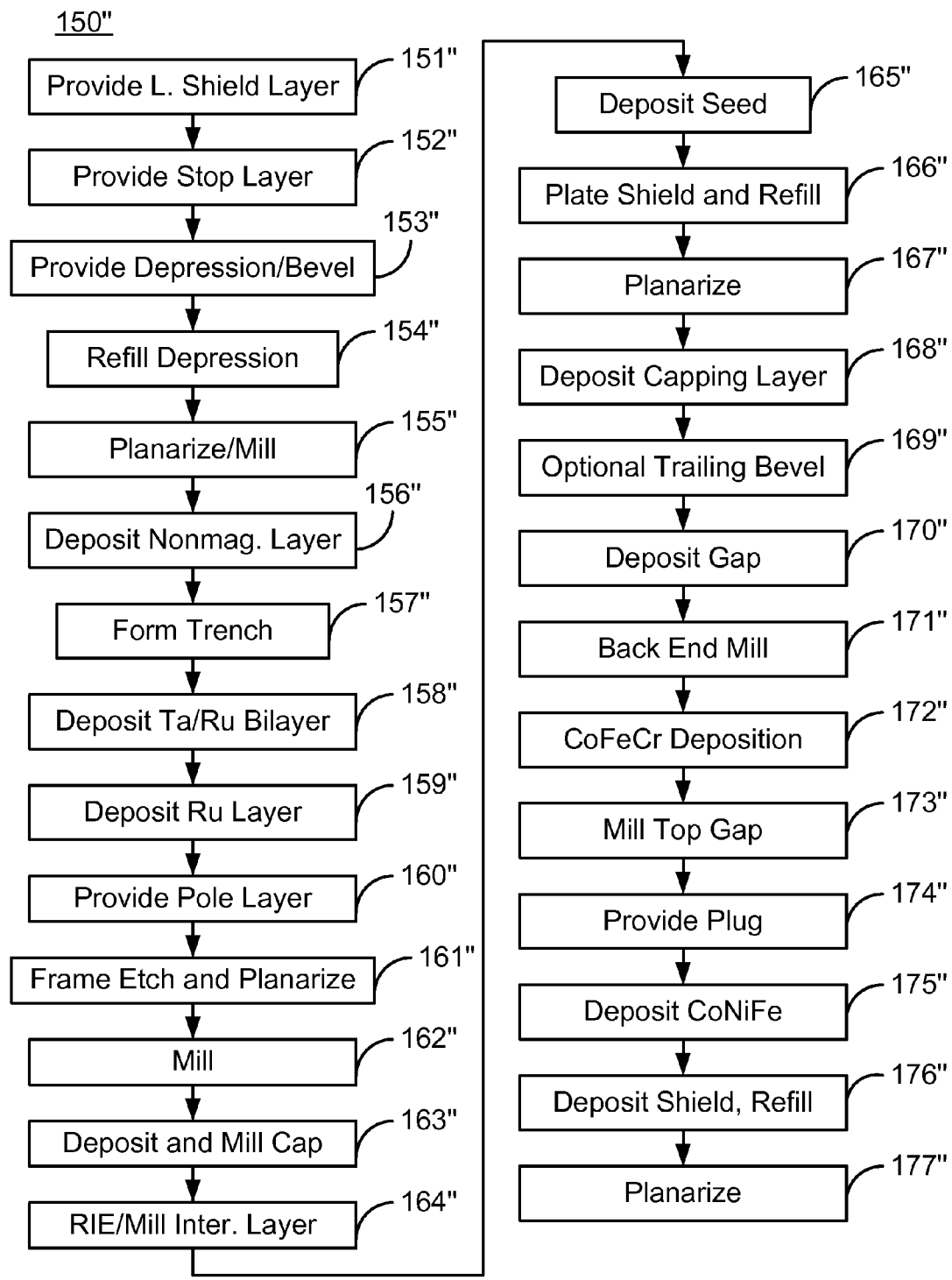
FIG. 33 is a flow chart depicting another exemplary embodiment of a method for fabricating a PMR transducer.

FIG. 33 is a flow chart depicting another exemplary embodiment of a method 150" for fabricating a PMR transducer. For simplicity, some steps may be omitted. FIGS. 34-39 are diagrams depicting side and ABS views of an exemplary embodiment of a portion of a PMR transducer during 300" fabrication. For clarity, FIGS. 34-39 are not to scale. Further, although FIGS. 34-39 depict the ABS location and ABS at a particular point in the pole, other embodiments may have other locations for the ABS. Referring to FIGS. 33-39, the method 150" is described in the context of the PMR transducer 300". However, the method 150" may be used to form another device (not shown). The PMR transducer 300' being fabricated may be part of a merged head that also includes a read head (not shown in FIGS. 33-39) and resides on a slider (not shown) in a disk drive. The method 150" also may commence after formation of other portions of the PMR transducer 300". The method 150" is also described in the context of providing a single PMR transducer 300". However, the method 150" may be used to fabricate multiple transducers at substantially the same time. The method 150" and device 300" are also described in the context of particular layers. However, in some embodiments, such layers may include multiple sublayers. The method 150" is analogous to the method 150. Similarly, the transducer 300" is analogous to the transducer 300. Analogous steps and components are labeled similarly. Thus, only portions of the method 150" and transducer 300" are discussed.

Figure 34:
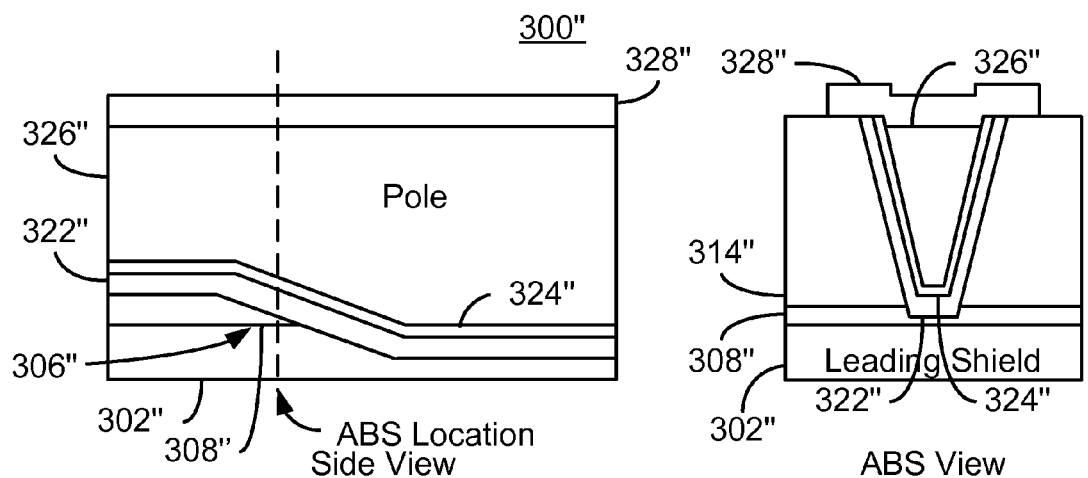
FIGS. 34-39 are diagrams depicting an exemplary embodiment of a perpendicular magnetic recording transducer during fabrication.

Steps 151"-163" are analogous to steps 151-163/151'-163'. Thus, FIG. 34 depicts the transducer 300" after step 163" is performed. Thus, the leading shield layer 302" and remaining portion of the stop layer 308" are shown. Also shown is the bevel 306" formed in the leading shield layer 302". Note that a portion of the stop layer 308" remains. Nonmagnetic layers are deposited in steps 158" and 159". In the embodiment shown, a Ta/Ru liner is deposited in step 158". In addition, a Ru layer is deposited via CVD in step 159". Pole materials 326" in a trench (not labeled) in intermediate layer 314" and capping layer 328" are also shown.

Figure 35:
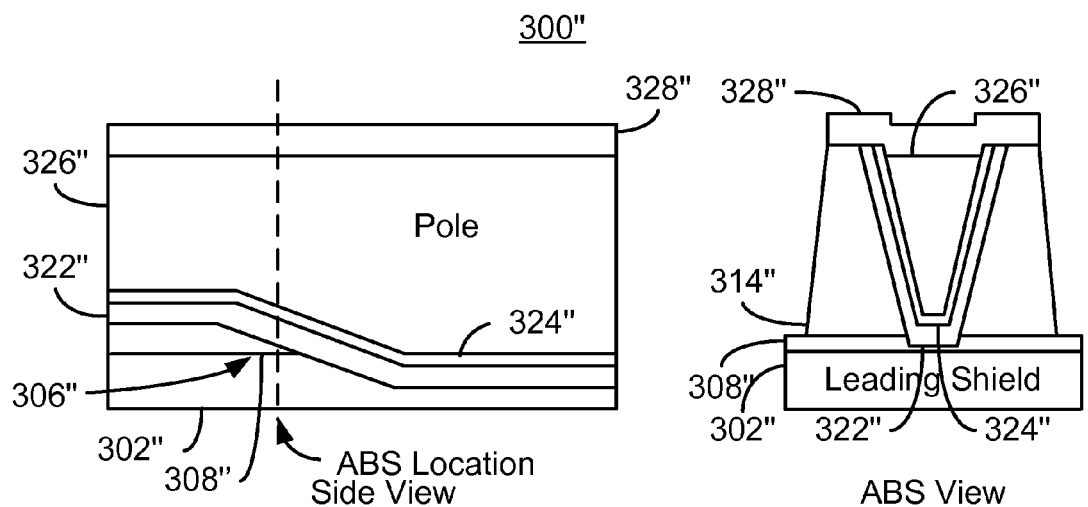
Figure 36:
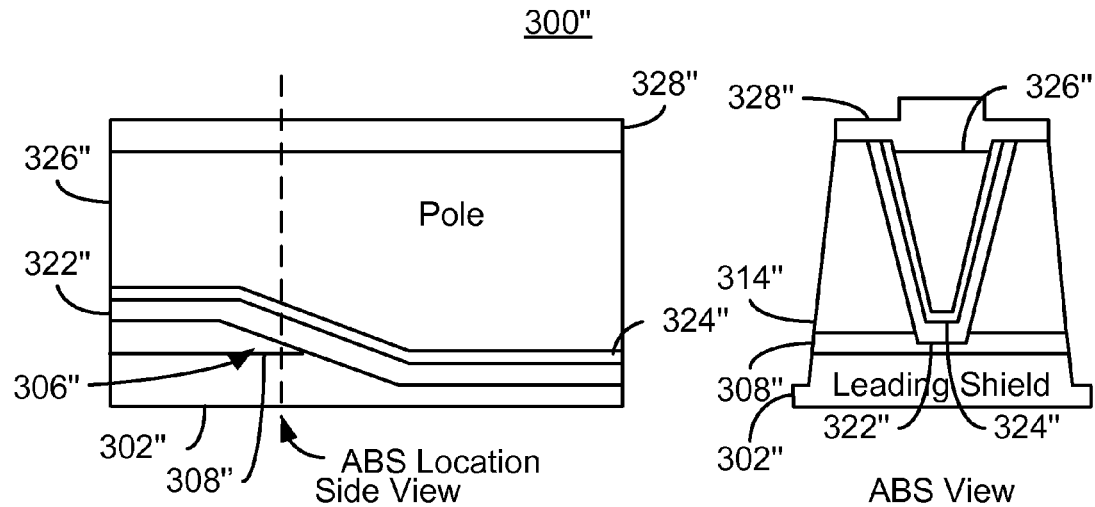

Step 164" is analogous to step 164 and 164' in that removal processes for the intermediate layer 314" is used. However, step 164" does not utilize a wet etch. Instead, only a portion of the intermediate layer is removed in step 164". For example, an RIE appropriate for the intermediate layer 314" may be used. FIG. 35 depicts the transducer 300" after the RIE of step 164" is performed. Thus, a portion of the intermediate layer 314" is removed, while the portion 314" adjacent to the layers 322" and 324" remains. Also in step 164", a Ru mill may be performed. More specifically, a mill that removes a portion of the nonmagnetic layers 308" and capping layers 328" is used. FIG. 36 depicts the transducer 300" after step 164" is performed. Thus, portions of the capping layer 328", stop layer (s) 308" and leading shield 302" have been removed.

Figure 37:
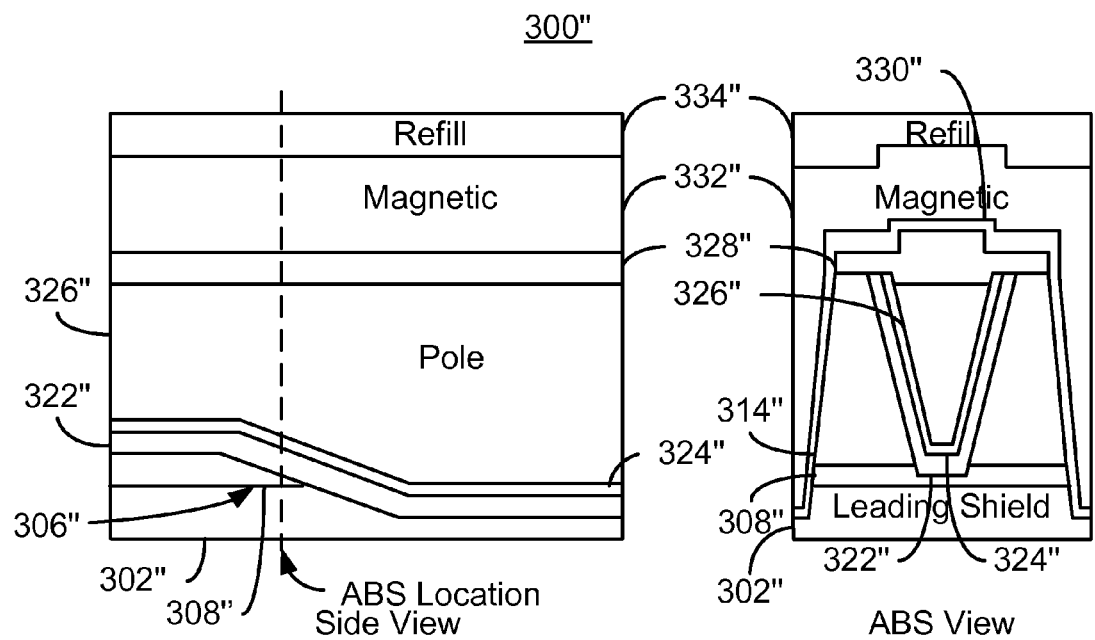

165"-166" are analogous to steps 165-166/165'-166'. FIG. 37 depicts the transducer 300" after step 166" is completed. Thus, a seed layer 330", a magnetic layer 332" and a refill layer 334" are shown. The magnetic layer 332" forms the side shields for the transducer 300".

Figure 38:
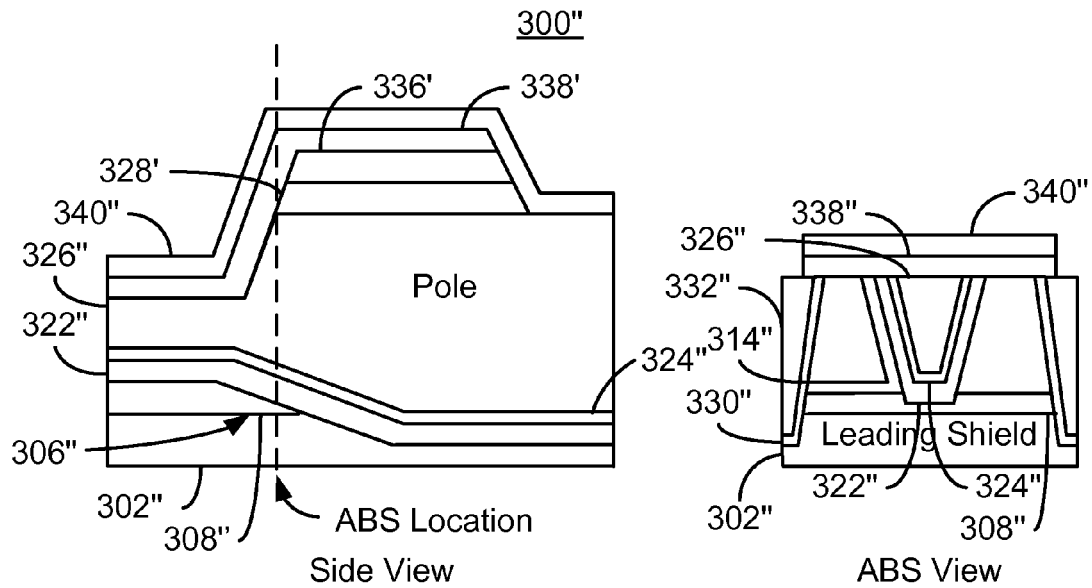

Steps 167"-172" are analogous to steps 167-172/167'-172'. FIG. 38 depicts the transducer after steps 167"-172" are performed. Thus, an optional top bevel is formed in the pole 326" and a gap layer 338" are provided. In addition, the capping layers 328" and 336", as well as gap layer 338", no longer extend to the back of the pole 326". Further, the CoFeCr layer 340" is deposited.

Figure 39:
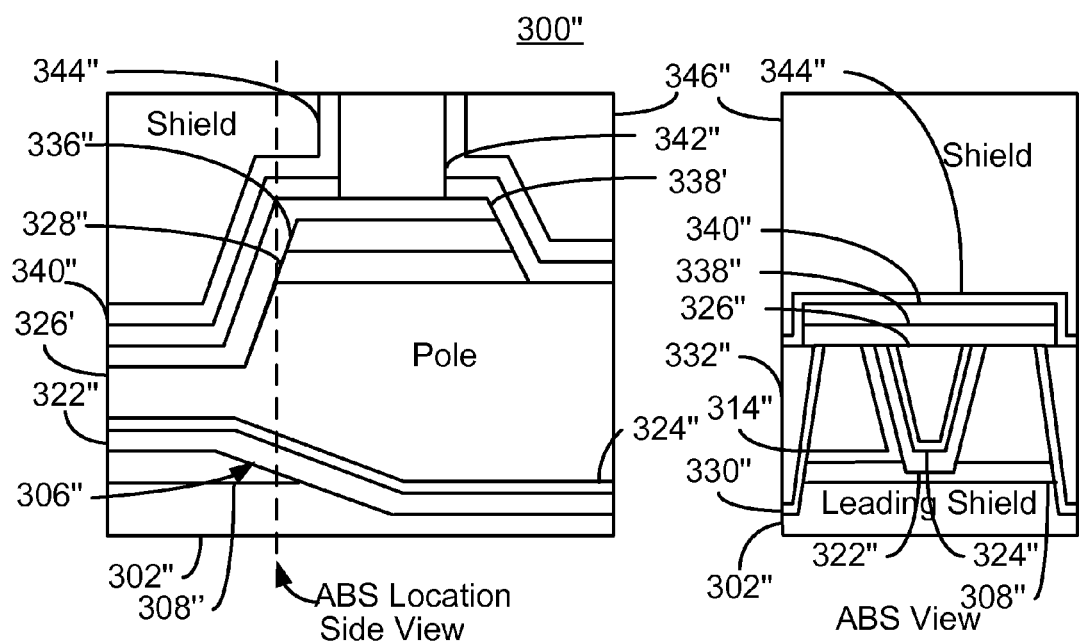

Steps 173"-177" are analogous to step 173-177/173'-177'. Thus, FIG. 39 depicts the transducer 300" after step 177" is completed. Thus, the nonmagnetic plug 342", CoFeNi seed 344", and shield 346" are shown.

Using the method 150", the PMR transducer 300" may be formed. The transducer 300" shares many of the benefits of the transducer 300. In addition, a non-conformal shield 332" has been provided. Consequently, the method 150" improves the flexibility in fabricating the transducers 300/300'/300".

Figure 40:
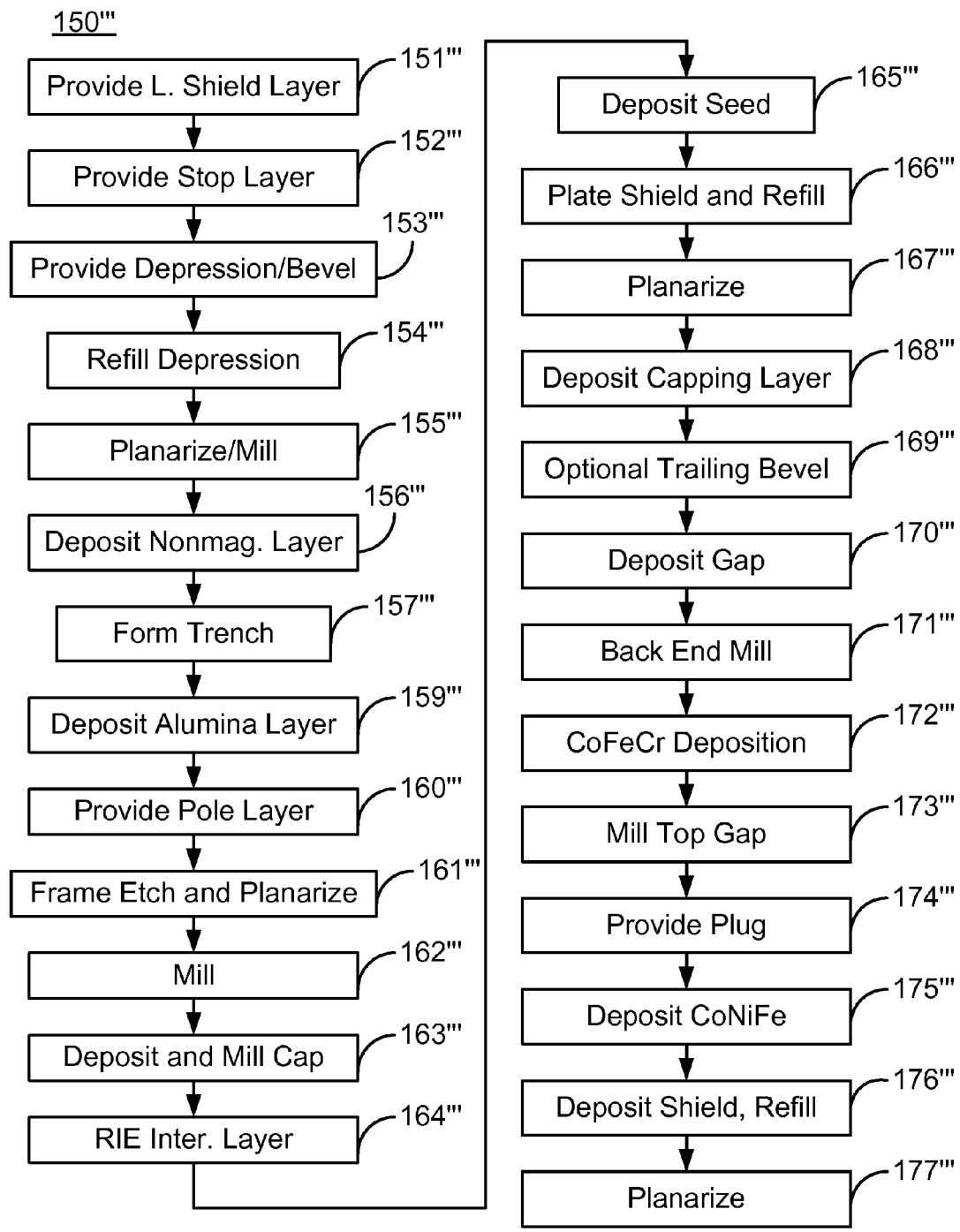
FIG. 40 is a flow chart depicting another exemplary embodiment of a method for fabricating a PMR transducer.

FIG. 40 is a flow chart depicting another exemplary embodiment of a method 150''' for fabricating a PMR transducer. For simplicity, some steps may be omitted. FIGS. 41-46 are diagrams depicting side and ABS views of an exemplary embodiment of a portion of a PMR transducer during 300''' fabrication. For clarity, FIGS. 41-46 are not to scale. Further, although FIGS. 41-46 depict the ABS location and ABS at a particular point in the pole, other embodiments may have other locations for the ABS. Referring to FIGS. 41-46, the method 150''' is described in the context of the PMR transducer 300'''. However, the method 150''' may be used to form another device (not shown). The PMR transducer 300''' being fabricated may be part of a merged head that also includes a read head (not shown in FIGS. 41-46) and resides on a slider (not shown) in a disk drive. The method 150''' also may commence after formation of other portions of the PMR transducer 300'''. The method 150''' is also described in the context of providing a single PMR transducer 300'''. However, the method 150''' may be used to fabricate multiple transducers at substantially the same time. The method 150''' and device 300''' are also described in the context of particular layers. However, in some embodiments, such layers may include multiple sublayers. The method 150''' is analogous to the methods 150/150'/150". Similarly, the transducer 300''' is analogous to the transducer 300/300'/300". Analogous steps and components are labeled similarly. Thus, only portions of the method 150" and transducer 300" are discussed.

Steps 151'''-157''' are analogous to steps 151-167/151'-167'/151"-167". Thus, bevels, and other features of the poles are formed. However, step 158', formation of a Ru liner, is omitted. Instead, an ALD alumina layer is deposited in step 159'''. Step 158' may be omitted because a wet etchant is not used.

Figure 41:
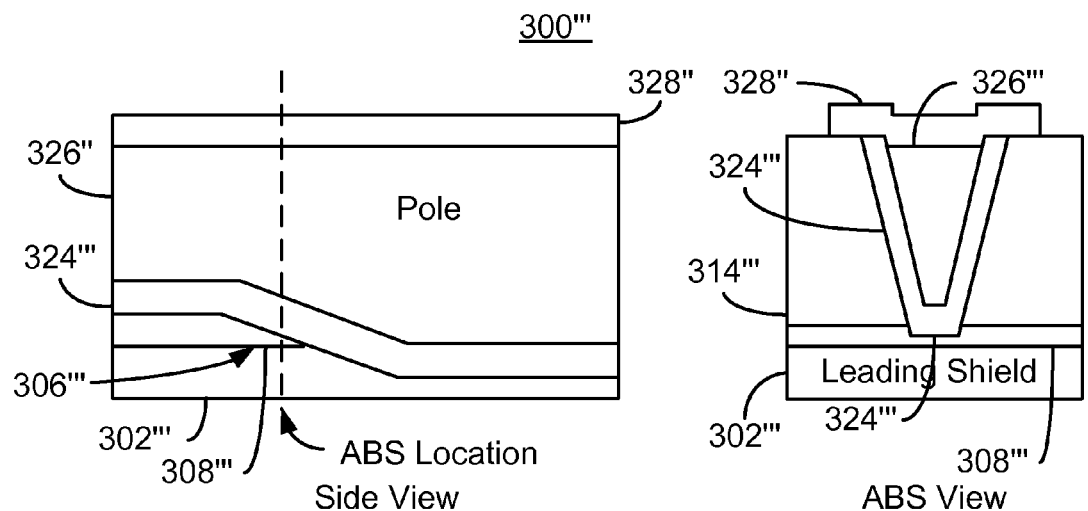
FIGS. 41-46 are diagrams depicting an exemplary embodiment of a perpendicular magnetic recording transducer during fabrication.

Thus, the ALD alumina layer 159" need not be protected from such an etchant. Steps 160'''-163''' are analogous to steps 160-163/160'-163'/160"-163". Thus, FIG. 41 depicts the transducer 300''' after step 163''' is performed. Thus, the leading shield layer 302''' and remaining portion of the stop layer 308''' are shown. Also shown is the bevel 306''' formed in the leading shield layer 302'''. Note that a portion of the stop layer 308''' remains. Pole materials 326''' in a trench (not labeled) in intermediate layer 314''' and capping layer 328''' are also shown.

Figure 42:
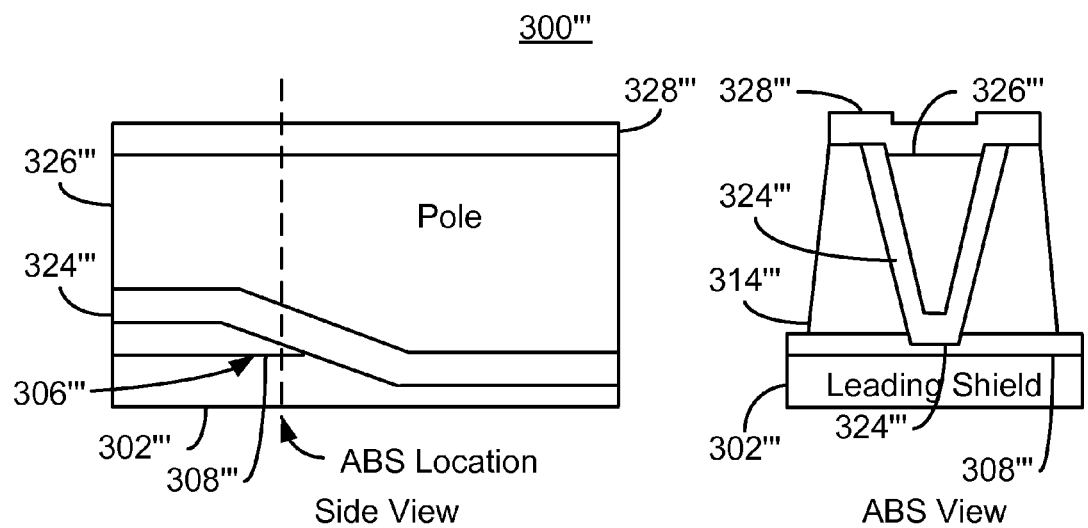
Figure 43:
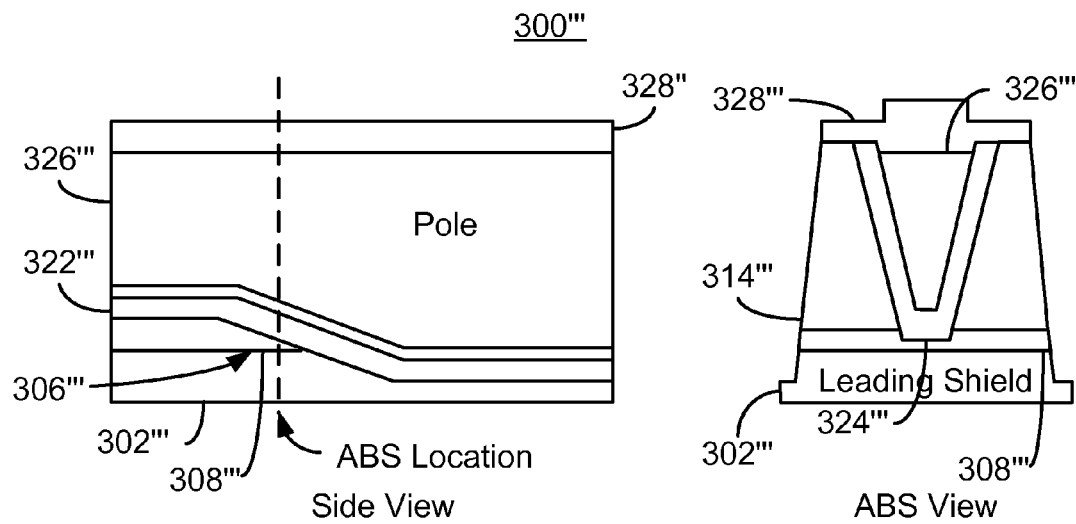

Step 164''' is analogous to steps 164 and 164' in that removal processes for the intermediate layer 314" is used. However, step 164''' is closer to step 164" in that a wet etch is not used. Instead, only a portion of the intermediate layer is removed in step 164". For example, an RIE appropriate for the intermediate layer 314''' may be used. FIG. 42 depicts the transducer 300''' after the RIE of step 164''' is performed. Thus, a portion of the intermediate layer 314''' is removed, while the portion 314''' adjacent to the layers 322''' and 324''' remains. Also in step 164''', a Ru mill may be performed. More specifically, a mill that removes a portion of the stop layers 308''' and capping layers 328''' is used. FIG. 43 depicts the transducer 300''' after step 164''' is performed. Thus, portions of the capping layer 328''', stop layer(s) 308''' and leading shield 302''' have been removed.

Figure 44:
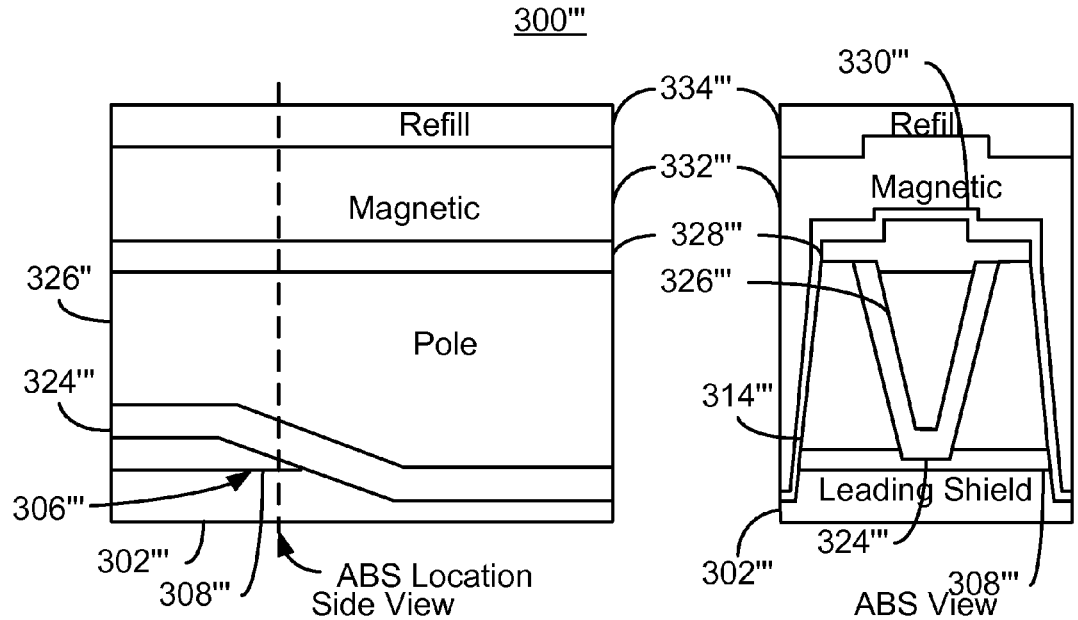

165'''-166''' are analogous to steps 165-166/165'-166'/165"-166". FIG. 44 depicts the transducer 300''' after step 166''' is completed. Thus, a seed layer 330''', a magnetic layer 332''' and a refill layer 334''' are shown. The magnetic layer 332''' forms the side shields for the transducer 300'''.

Figure 45:
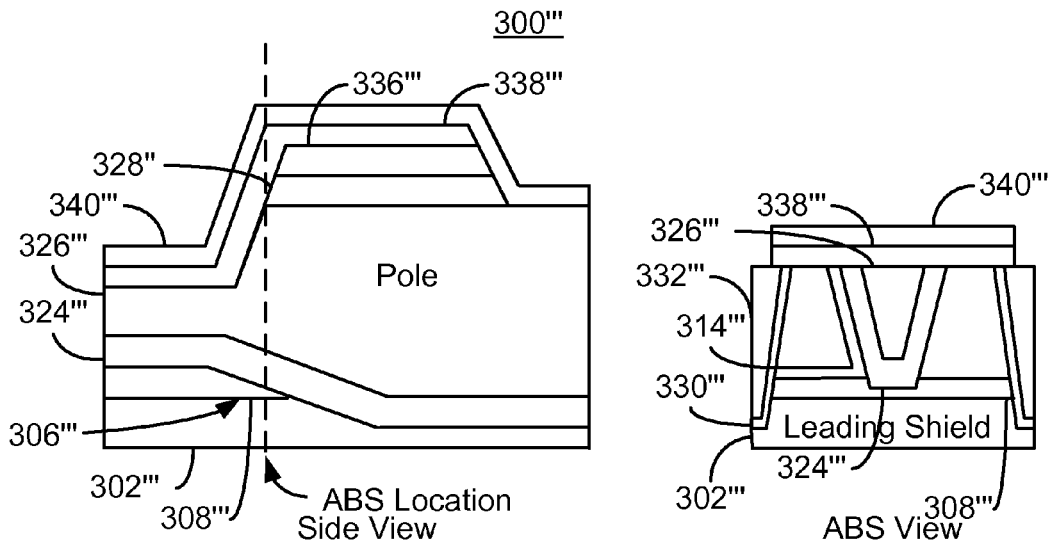

Steps 167'''-172''' are analogous to steps 167-172/167'-172'/167"-172". FIG. 45 depicts the transducer after steps 167'''-172''' are performed. Thus, an optional top bevel is formed in the pole 326''' and a gap layer 338''' are provided. In addition, the capping layers 328''' and 336''', as well as gap layer 338''', no longer extend to the back of the pole 326". Further, the CoFeCr layer 340''' is deposited.

Figure 46:
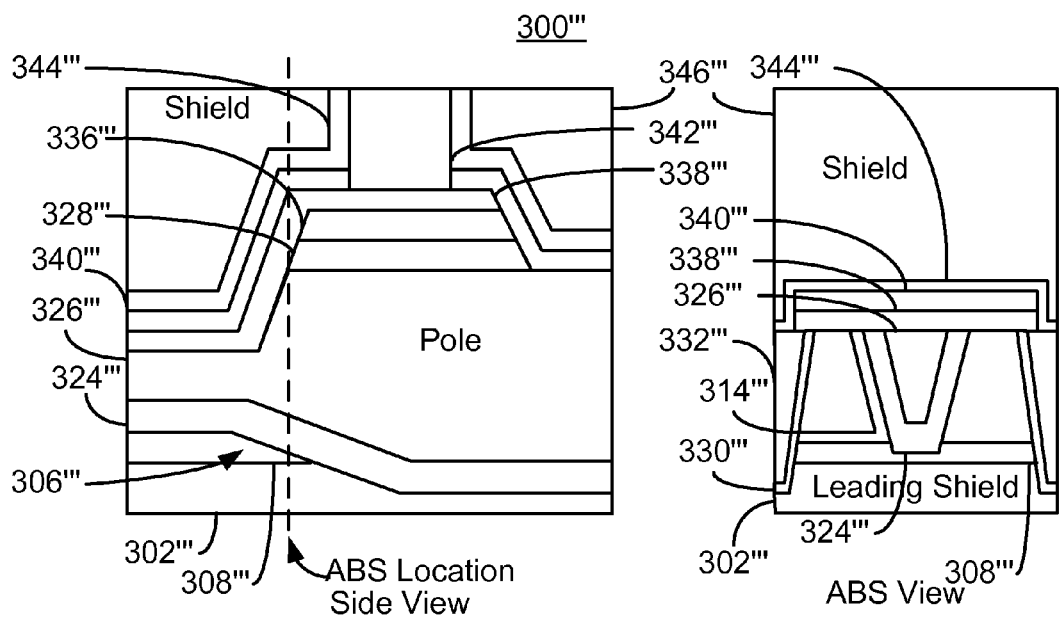

Steps 173'''-177''' are analogous to step 173-177/173'-177'/173"-177". Thus, FIG. 46 depicts the transducer 300''' after step 177''' is completed. Thus, the nonmagnetic plug 342''', CoNiFe seed 344''', and shield 346''' are shown.

Using the method 150''', the PMR transducer 300''' may be formed. The transducer 300''' shares many of the benefits of the transducers 300/300'/300". Because an alumina layer 324" is used in lieu of a Ru layer, the cost of the transducer 300" may be reduced over that of the transducers 300 and 300". In addition, a non-conformal shield 332" has been provided. Consequently, the method 150" improves the flexibility in fabricating the transducers 300/300'/300". Thus, using the methods 100, 150, 150', 150", and 150", a variety of configurations of transducers 200, 200', 300, 300', 300", and 300" having various advantages may be provided.

We claim:

1. A method for fabricating a pole of a magnetic transducer having an air-bearing surface (ABS) location, the method comprising:
    providing a leading shield layer;
    providing a planarization stop layer on the leading shield layer;
    removing a portion of the planarization stop layer distal from the ABS location to form an aperture therein and a portion of the leading shield layer distal from the ABS location to form a depression therein, the depression forming a bevel distal from the ABS location, the bevel being at an angle greater than zero degrees and less than ninety degrees from a direction perpendicular to the ABS location;
    providing an intermediate layer having a top surface substantially perpendicular to the ABS location and covering at least the depression in the leading shield layer;
    removing a portion of the intermediate layer to form a trench therein, the trench having a bottom corresponding to the leading shield and a location and a profile corresponding to the pole, the bottom of the trench having a sloped surface corresponding to the bevel;
    providing a nonmagnetic layer, at least a portion of the nonmagnetic layer residing in the trench;
    providing the pole in the trench, the pole residing on the portion of the nonmagnetic layer and having a leading edge bevel corresponding to the bevel;
    providing a capping layer covering the pole;
    removing at least a portion of the intermediate layer; and
    providing a wrap-around shield.

2. The method of claim 1 wherein the leading shield layer includes a leading shield surface between the ABS location and the depression, the leading shield surface being substantially perpendicular to the ABS location, and wherein the step of providing the intermediate layer further includes:
    depositing a refill material on the planarization stop layer and the leading shield layer, a portion of the refill material residing in the depression;
    planarizing the magnetic transducer;
    providing a flattening mill, the flatting mill removing a remaining portion of the planarization stop layer, a remaining portion of the refill material having a refill surface substantially coplanar with the leading shield surface; and
    depositing an additional nonmagnetic layer, the additional nonmagnetic layer having the top surface.

3. The method of claim 2 wherein the wrap-around shield is a non-conformal wrap-around shield and the step of removing at least a portion of the intermediate layer further includes:
    removing a non-adjoining portion of the intermediate layer, a remaining portion of the intermediate layer adjoining the nonmagnetic layer; and
    providing a side shield.

4. The method of claim 3 wherein the step of removing the intermediate layer further includes:
    performing a reactive ion etch.

5. The method of claim 2 wherein the wrap-around shield is a conformal wrap-around shield and the step of removing at least a portion of the intermediate layer further includes:
    removing an adjoining portion of the intermediate layer that adjoins the nonmagnetic layer and the capping layer; and
    providing a side shield adjoining a portion of the nonmagnetic layer and the capping layer.

6. The method of claim 5 wherein the step of removing the intermediate layer further includes:
    performing a wet etch.

7. The method of claim 5 wherein the step of providing the side shield further includes:
    depositing at least one side shield material adjoining the portion of the nonmagnetic layer and the capping layer;
    depositing an alumina fill layer on the at least one side shield material; and
    planarizing the magnetic transducer.

8. The method of claim 1 wherein the step of providing the nonmagnetic layer further includes providing a nonmagnetic bilayer.

9. The method of claim 8 wherein the step of providing the nonmagnetic bilayer further includes:
    providing a Ta layer and a first Ru layer.

10. The method of claim 9 wherein the step of providing the nonmagnetic layer further includes:
   providing a second Ru layer on the nonmagnetic bilayer layer.

11. A method for fabricating a pole of a magnetic transducer having an air-bearing surface (ABS) location, the method comprising:
   providing a leading shield layer;
   providing a planarization stop layer on the leading shield layer, the planarization stop layer including at least one of Ta, Ru, and Cr;
   removing a portion of the planarization stop layer distal from the ABS location to form an aperture therein and a portion of the leading shield layer distal from the ABS location to form a depression therein, the depression forming a bevel distal from the ABS location, the bevel being at an angle greater than zero degrees and less than ninety degrees from a direction perpendicular to the ABS location;
   providing an intermediate layer having a top surface substantially perpendicular to the ABS location;
   removing a portion of the intermediate layer to form a trench therein, the trench having a bottom corresponding to the leading shield and a location and a profile corresponding to the pole;
   providing a nonmagnetic layer, at least a portion of the nonmagnetic layer residing in the trench;
   providing the pole in the trench, the pole residing on the portion of the nonmagnetic layer and having a leading edge bevel corresponding to the bevel;
   providing a capping layer covering the pole;
   removing at least a portion of the intermediate layer; and
   providing a wrap-around shield.

12. A method for fabricating a pole of a magnetic transducer having an air-bearing surface (ABS) location, the method comprising:
   providing a leading shield layer, wherein the leading shield layer includes a leading shield surface between the ABS location and the depression, the leading shield surface being substantially perpendicular to the ABS location, and wherein the step of providing the intermediate layer further includes
      depositing a refill material on the planarization stop layer and the leading shield layer, a portion of the refill material residing in the depression;
      planarizing the magnetic transducer;
      providing a flattening mill, the flatting mill removing a remaining portion of the planarization stop layer, a remaining portion of the refill material having a refill surface substantially coplanar with the leading shield surface; and
      depositing an additional nonmagnetic layer, the additional nonmagnetic layer having the to surface;
   providing a planarization stop layer on the leading shield layer;
   removing a portion of the planarization stop layer distal from the ABS location to form an aperture therein and a portion of the leading shield layer distal from the ABS location to form a depression therein, the depression forming a bevel distal from the ABS location, the bevel being at an angle greater than zero degrees and less than ninety degrees from a direction perpendicular to the ABS location;
   providing an intermediate layer having a top surface substantially perpendicular to the ABS location, wherein the wrap-around shield is a conformal wrap-around shield and the step of removing at least a portion of the intermediate layer further includes:
      removing an adjoining portion of the intermediate layer that adjoins the nonmagnetic layer and the capping layer; and
      providing a side shield adjoining a portion of the nonmagnetic layer and the capping layer;
   removing a portion of the intermediate layer to form a trench therein, the trench having a bottom corresponding to the leading shield and a location and a profile corresponding to the pole, the step of removing at least a portion of the intermediate layer further including
      removing an adjoining portion of the intermediate layer that adjoins the nonmagnetic layer and the capping layer; and
      providing a side shield adjoining a portion of the nonmagnetic layer and the capping layer;
   providing a nonmagnetic layer, at least a portion of the nonmagnetic layer residing in the trench wherein the step of providing the nonmagnetic layer further includes
      providing a nonmagnetic bilayer including a Ta layer and a first Ru layer: and
      providing a second Ru layer on the nonmagnetic bilayer layer using a chemical vapor deposition (CVD);
   providing the pole in the trench, the pole residing on the portion of the nonmagnetic layer and having a leading edge bevel corresponding to the bevel;
   providing a capping layer covering the pole;
   removing at least a portion of the intermediate layer; and
   providing a wrap-around shield, the wrap-around shield being a conformal wrap-around shield.

13. A method for fabricating a pole of a magnetic transducer having an air-bearing surface (ABS) location, the method comprising:
   providing a leading shield layer, wherein the leading shield layer includes a leading shield surface between the ABS location and the depression, the leading shield surface being substantially perpendicular to the ABS location, and wherein the step of providing the intermediate layer further includes
      depositing a refill material on the planarization stop layer and the leading shield layer, a portion of the refill material residing in the depression;
      planarizing the magnetic transducer;
      providing a flattening mill, the flatting mill removing a remaining portion of the planarization stop layer, a remaining portion of the refill material having a refill surface substantially coplanar with the leading shield surface; and
      depositing an additional nonmagnetic layer, the additional nonmagnetic layer having the top surface;
   providing a planarization stop layer on the leading shield layer;
   removing a portion of the planarization stop layer distal from the ABS location to form an aperture therein and a portion of the leading shield layer distal from the ABS location to form a depression therein, the depression forming a bevel distal from the ABS location, the bevel being at an angle greater than zero degrees and less than ninety degrees from a direction perpendicular to the ABS location;
   providing an intermediate layer having a top surface substantially perpendicular to the ABS location, wherein the step of removing at least a portion of the intermediate layer further includes:

removing an adjoining portion of the intermediate layer that adjoins the nonmagnetic layer and the capping layer; and providing a side shield adjoining a portion of the nonmagnetic layer and the capping layer;

removing a portion of the intermediate layer to form a trench therein, the trench having a bottom corresponding to the leading shield and a location and a profile corresponding to the pole;

providing a nonmagnetic layer, at least a portion of the nonmagnetic layer residing in the trench, wherein the step of providing the nonmagnetic layer further includes:

providing a Ru liner using a chemical vapor deposition (CVD) and providing an alumina layer using atomic layer deposition;

providing the pole in the trench, the pole residing on the portion of the nonmagnetic layer and having a leading edge bevel corresponding to the bevel;

providing a capping layer covering the pole;

removing at least a portion of the intermediate layer; and providing a wrap-around shield, the wrap-around shield being a conformal wrap-around shield.

14. A method for fabricating a pole of a magnetic transducer having an air-bearing surface (ABS) location, the method comprising:

providing a leading shield layer, wherein the leading shield layer includes a leading shield surface between the ABS location and the depression, the leading shield surface being substantially perpendicular to the ABS location, and wherein the step of providing the intermediate layer further includes depositing a refill material on the planarization stop layer and the leading shield layer, a portion of the refill material residing in the depression;

planarizing the magnetic transducer;

providing a flattening mill, the flatting mill removing a remaining portion of the planarization stop layer, a remaining portion of the refill material having a refill surface substantially coplanar with the leading shield surface; and depositing an additional nonmagnetic layer, the additional nonmagnetic layer having the top surface;

providing a planarization stop layer on the leading shield layer;

removing a portion of the planarization stop layer distal from the ABS location to form an aperture therein and a portion of the leading shield layer distal from the ABS location to form a depression therein, the depression forming a bevel distal from the ABS location, the bevel being at an angle greater than zero degrees and less than ninety degrees from a direction perpendicular to the ABS location;

providing an intermediate layer having a top surface substantially perpendicular to the ABS location;

removing a portion of the intermediate layer to form a trench therein, the trench having a bottom corresponding to the leading shield and a location and a profile corresponding to the pole, wherein the step of removing at least a portion of the intermediate layer further includes:

removing an adjoining portion of the intermediate layer that adjoins the nonmagnetic layer and the capping layer; and providing a side shield adjoining a portion of the nonmagnetic layer and the capping layer providing a nonmagnetic layer, at least a portion of the nonmagnetic layer residing in the trench;

providing the pole in the trench, the pole residing on the portion of the nonmagnetic layer and having a leading edge bevel corresponding to the bevel;

providing a capping layer covering the pole;

removing at least a portion of the intermediate layer; and providing a wrap-around shield, the wrap-around shield being a conformal wrap-around shield;

providing at least one additional capping layer, the at least one additional capping layer residing on the side shield and the capping layer; and forming a trailing edge bevel, a portion of the capping layer, a trailing edge portion of the pole, and a portion of the at least one additional capping layer proximate to the ABS location being removed during the forming of the trailing edge bevel, a remaining portion of the at least one additional capping layer and a remaining portion of the at least one additional capping layer residing distal from the ABS;

providing a top gap layer; and wherein the step of providing the wrap-around shield further includes providing a top shield.

15. The method of claim 14 wherein the step of providing the top shield further includes:

removing a portion of the top gap layer and a portion of each of the remaining portion of the capping layer and the remaining portion of the additional capping layer distal from the ABS location;

providing a seed layer;

removing a first portion of the seed layer and a portion of the gap layer proximate to the ABS and distal from the pole location; and providing a remaining portion of the top shield.

16. The method of claim 15 wherein the step of providing the top shield further includes:

removing a second portion of the seed layer distal from the ABS after the first portion is removed and before the remaining portion of the top shield is provided, thereby forming an aperture in the seed layer;

providing a nonmagnetic plug in the aperture extending through the seed layer before the remaining portion of the top shield is provided.

17. A method for fabricating a pole of a magnetic transducer having an air-bearing surface (ABS) location, the method comprising:

providing a leading shield layer, wherein the leading shield layer includes a leading shield surface between the ABS location and the depression, the leading shield surface being substantially perpendicular to the ABS location, and wherein the step of providing the intermediate layer further includes depositing a refill material on the planarization stop layer and the leading shield layer, a portion of the refill material residing in the depression;

planarizing the magnetic transducer;

providing a flattening mill, the flatting mill removing a remaining portion of the planarization stop layer, a remaining portion of the refill material having a refill surface substantially coplanar with the leading shield surface; and depositing an additional nonmagnetic layer, the additional nonmagnetic layer having the to surface;

providing a planarization stop layer on the leading shield layer;

removing a portion of the planarization stop layer distal from the ABS location to form an aperture therein and a portion of the leading shield layer distal from the ABS location to form a depression therein, the depression forming a bevel distal from the ABS location, the bevel being at an angle greater than zero degrees and less than ninety degrees from a direction perpendicular to the ABS location;

providing an intermediate layer having a top surface substantially perpendicular to the ABS location;

removing a portion of the intermediate layer to form a trench therein, the trench having a bottom corresponding to the leading shield and a location and a profile corresponding to the pole, the step of removing at least a portion of the intermediate layer further including removing a non-adjoining portion of the intermediate layer, a remaining portion of the intermediate layer adjoining the nonmagnetic layer; and providing a side shield;

providing a nonmagnetic layer, at least a portion of the nonmagnetic layer residing in the trench, wherein the step of providing the nonmagnetic layer further includes:

providing a nonmagnetic bilayer layer including a Ta layer and a first Ru layer; and providing a second Ru layer using a chemical vapor deposition (CVD);

providing the pole in the trench, the pole residing on the portion of the nonmagnetic layer and having a leading edge bevel corresponding to the bevel;

providing a capping layer covering the pole;

removing at least a portion of the intermediate layer; and providing a wrap-around shield, the wrap-around shield being a non-conformal wrap-around shield.

18. A method for fabricating a pole of a magnetic transducer having an air-bearing surface (ABS) location, the method comprising:

providing a leading shield layer, wherein the leading shield layer includes a leading shield surface between the ABS location and the depression, the leading shield surface being substantially perpendicular to the ABS location, and wherein the step of providing the intermediate layer further includes depositing a refill material on the planarization stop layer and the leading shield layer, a portion of the refill material residing in the depression;

planarizing the magnetic transducer;

providing a flattening mill, the flatting mill removing a remaining portion of the planarization stop layer, a remaining portion of the refill material having a refill surface substantially coplanar with the leading shield surface; and depositing an additional nonmagnetic layer, the additional nonmagnetic layer having the to surface;

providing a planarization stop layer on the leading shield layer;

removing a portion of the planarization stop layer distal from the ABS location to form an aperture therein and a portion of the leading shield layer distal from the ABS location to form a depression therein, the depression forming a bevel distal from the ABS location, the bevel being at an angle greater than zero degrees and less than ninety degrees from a direction perpendicular to the ABS location;

providing an intermediate layer having a top surface substantially perpendicular to the ABS location;

removing a portion of the intermediate layer to form a trench therein, the trench having a bottom corresponding to the leading shield and a location and a profile corresponding to the pole, the step of removing at least a portion of the intermediate layer further including removing a non-adjoining portion of the intermediate layer, a remaining portion of the intermediate layer adjoining the nonmagnetic layer; and providing a side shield;

providing a nonmagnetic layer, at least a portion of the nonmagnetic layer residing in the trench, wherein the step of providing the nonmagnetic layer further includes:

providing an alumina layer using atomic layer deposition;

providing the pole in the trench, the pole residing on the portion of the nonmagnetic layer and having a leading edge bevel corresponding to the bevel;

providing a capping layer covering the pole;

removing at least a portion of the intermediate layer; and providing a wrap-around shield, the wrap-around shield being a non-conformal wrap-around shield.

19. A method for fabricating a pole of a magnetic transducer having an air-bearing surface (ABS) location, the method comprising:

providing a leading shield layer, wherein the leading shield layer includes a leading shield surface between the ABS location and the depression, the leading shield surface being substantially perpendicular to the ABS location, and wherein the step of providing the intermediate layer further includes depositing a refill material on the planarization stop layer and the leading shield layer, a portion of the refill material residing in the depression;

planarizing the magnetic transducer;

providing a flattening mill, the flatting mill removing a remaining portion of the planarization stop layer, a remaining portion of the refill material having a refill surface substantially coplanar with the leading shield surface; and depositing an additional nonmagnetic layer, the additional nonmagnetic layer having the to surface;

providing a planarization stop layer on the leading shield layer;

removing a portion of the planarization stop layer distal from the ABS location to form an aperture therein and a portion of the leading shield layer distal from the ABS location to form a depression therein, the depression forming a bevel distal from the ABS location, the bevel being at an angle greater than zero degrees and less than ninety degrees from a direction perpendicular to the ABS location;

providing an intermediate layer having a top surface substantially perpendicular to the ABS location, the step of removing at least a portion of the intermediate layer further including removing a non-adjoining portion of the intermediate layer, a remaining portion of the intermediate layer adjoining the nonmagnetic layer; and providing a side shield, wherein the step of providing the side shield further includes:

depositing at least one side shield material adjoining the portion of the nonmagnetic layer and the capping layer;

depositing an alumina fill layer on the at least one side shield material; and planarizing the magnetic transducer;

removing a portion of the intermediate layer to form a trench therein, the trench having a bottom corresponding to the leading shield and a location and a profile corresponding to the pole;

providing a nonmagnetic layer, at least a portion of the nonmagnetic layer residing in the trench, providing the pole in the trench, the pole residing on the portion of the nonmagnetic layer and having a leading edge bevel corresponding to the bevel;

providing a capping layer covering the pole;

removing at least a portion of the intermediate layer; and providing a wrap-around shield, the wrap-around shield being a non-conformal wrap-around shield.

20. A method for fabricating a pole of a magnetic transducer having an air-bearing surface (ABS) location, the method comprising:

providing a leading shield layer, wherein the leading shield layer includes a leading shield surface between the ABS location and the depression, the leading shield surface being substantially perpendicular to the ABS location, and wherein the step of providing the intermediate layer further includes depositing a refill material on the planarization stop layer and the leading shield layer, a portion of the refill material residing in the depression;

planarizing the magnetic transducer;

providing a flattening mill, the flatting mill removing a remaining portion of the planarization stop layer, a remaining portion of the refill material having a refill surface substantially coplanar with the leading shield surface; and depositing an additional nonmagnetic layer, the additional nonmagnetic layer having the to surface;

providing a planarization stop layer on the leading shield layer;

removing a portion of the planarization stop layer distal from the ABS location to form an aperture therein and a portion of the leading shield layer distal from the ABS location to form a depression therein, the depression forming a bevel distal from the ABS location, the bevel being at an angle greater than zero degrees and less than ninety degrees from a direction perpendicular to the ABS location;

providing an intermediate layer having a top surface substantially perpendicular to the ABS location;

removing a portion of the intermediate layer to form a trench therein, the trench having a bottom corresponding to the leading shield and a location and a profile corresponding to the pole, the step of removing at least a portion of the intermediate layer further includes removing a non-adjoining portion of the intermediate layer, a remaining portion of the intermediate layer adjoining the nonmagnetic layer; and providing a side shield providing a nonmagnetic layer, at least a portion of the nonmagnetic layer residing in the trench;

providing the pole in the trench, the pole residing on the portion of the nonmagnetic layer and having a leading edge bevel corresponding to the bevel;

providing a capping layer covering the pole;

providing at least one additional capping layer, the at least one additional capping layer residing on the side shield and the capping layer;

forming a trailing edge bevel, a portion of the capping layer, a trailing edge portion of the pole, and a portion of the at least one additional capping layer proximate to the ABS location being removed during the forming of the trailing edge bevel, a remaining portion of the at least one additional capping layer and a remaining portion of the at least one additional capping layer residing distal from the ABS;

providing a top gap layer;

removing at least a portion of the intermediate layer;

providing a wrap-around shield, the wrap-around shield being a non-conformal wrap-around shield, the step of providing the wrap-around shield further including providing a top shield.

21. The method of claim 20 wherein the step of providing the top shield further includes:

removing a portion of the top gap layer and a portion of each of the remaining portion of the capping layer and the remaining portion of the additional capping layer distal from the ABS location;

providing a seed layer;

removing a first portion of the seed layer and a portion of the gap layer proximate to the ABS and distal from the pole location; and providing a remaining portion of the top shield.

22. The method of claim 21 wherein the step of providing the top shield further includes:

removing a second portion of the seed layer distal from the ABS after the first portion is removed and before the remaining portion of the top shield is provided, thereby forming an aperture in the seed layer;

providing a nonmagnetic plug in the aperture extending through the seed layer before the remaining portion of the top shield is provided.

* * * * *